US012590444B2

(12) United States Patent
Fukuda et al.

(10) Patent No.: US 12,590,444 B2
(45) Date of Patent: Mar. 31, 2026

(54) WORKING VEHICLE AND ATTACHMENT USAGE SYSTEM

(71) Applicant: KUBOTA CORPORATION, Osaka (JP)

(72) Inventors: Yuji Fukuda, Sakai (JP); Tomoyuki Noguchi, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 171 days.

(21) Appl. No.: 18/427,949

(22) Filed: Jan. 31, 2024

(65) Prior Publication Data

US 2025/0243646 A1      Jul. 31, 2025

(51) Int. Cl.
*E02F 9/26* (2006.01)
*H04B 17/318* (2015.01)

(52) U.S. Cl.
CPC ............ *E02F 9/264* (2013.01); *H04B 17/318* (2015.01)

(58) Field of Classification Search
None
See application file for complete search history.

(56) References Cited

U.S. PATENT DOCUMENTS

2013/0069760 A1* 3/2013 Lickfelt ................. H04B 17/29
455/67.11
2021/0340726 A1* 11/2021 Vandegrift .............. E02F 9/265

2021/0381194 A1* 12/2021 Kennedy ............... E02F 9/0841
2022/0398534 A1* 12/2022 Kuck ................. G06Q 10/0833
2022/0412040 A1* 12/2022 Zitterbart ................ E02F 3/431

FOREIGN PATENT DOCUMENTS

| | | | | | |
|---|---|---|---|---|---|
| CN | 113015238 | A | * | 6/2021 | ........... H04W 64/00 |
| CN | 110578347 | B | * | 8/2022 | ........... E02F 9/2033 |
| DE | 102019208346 | A1 | * | 12/2020 | ........... A01B 59/00 |
| FR | 3027426 | A1 | * | 4/2016 | ........... A01B 59/00 |
| WO | WO-2022009922 | A1 | * | 1/2022 | ........... E02F 9/264 |

* cited by examiner

*Primary Examiner* — Hitesh Patel
*Assistant Examiner* — Elle Rose Knudson
(74) *Attorney, Agent, or Firm* — Keating & Bennett, LLP

(57) ABSTRACT

A working vehicle includes a linkage to attach/detach an attachment thereto/therefrom, a receiver to receive wireless signal(s) which are transmitted periodically from transmitter(s) in or on one or more of the attachments, which include respective piece(s) of identification information of the attachment(s), and which are compliant with a near field communication standard, and a controller configured or programmed to select a piece of identification information of the attachment attached to the linkage based on the piece(s) of identification information included in the wireless signal(s) received by the receiver and on received signal strength(s) of the wireless signal(s), and perform a prede-termined process based on the selected piece of identifica-tion information. The controller is configured or pro-grammed to correct the received signal strength(s) based on the piece(s) of identification information, and select the piece of identification information of the attachment attached to the linkage based on the corrected received signal strength(s).

23 Claims, 27 Drawing Sheets

Fig.3

| Attachment ID | Correction value (first correction value) |
|---|---|
| ATT0001 | ***% |
| ATT0002 | ***% |
| ATT0003 | ***% |
| ⋮ | ⋮ |

Fig.4

| Attachment ID | Display data |
|---------------|--------------|
| ATT0001 | Name<br>Specifications<br>Icon etc. |
| ATT0002 | Name<br>Specifications<br>Icon etc. |
| ATT0003 | Name<br>Specifications<br>Icon etc. |
| ⋮ | ⋮ |

Fig.5

| Attachment ID | Control data<br>Amount of supply<br>of hydraulic fluid |
|:---:|:---:|
| ATT0001 | None |
| ATT0002 | Small |
| ATT0003 | Large |
| ⋮ | ⋮ |

<Attachment information collecting process>

Internal memory

<Securing-of-attachment recognizing process>

G1

<Attachment information collecting process>

<Attachment information collecting process>

Fig.12

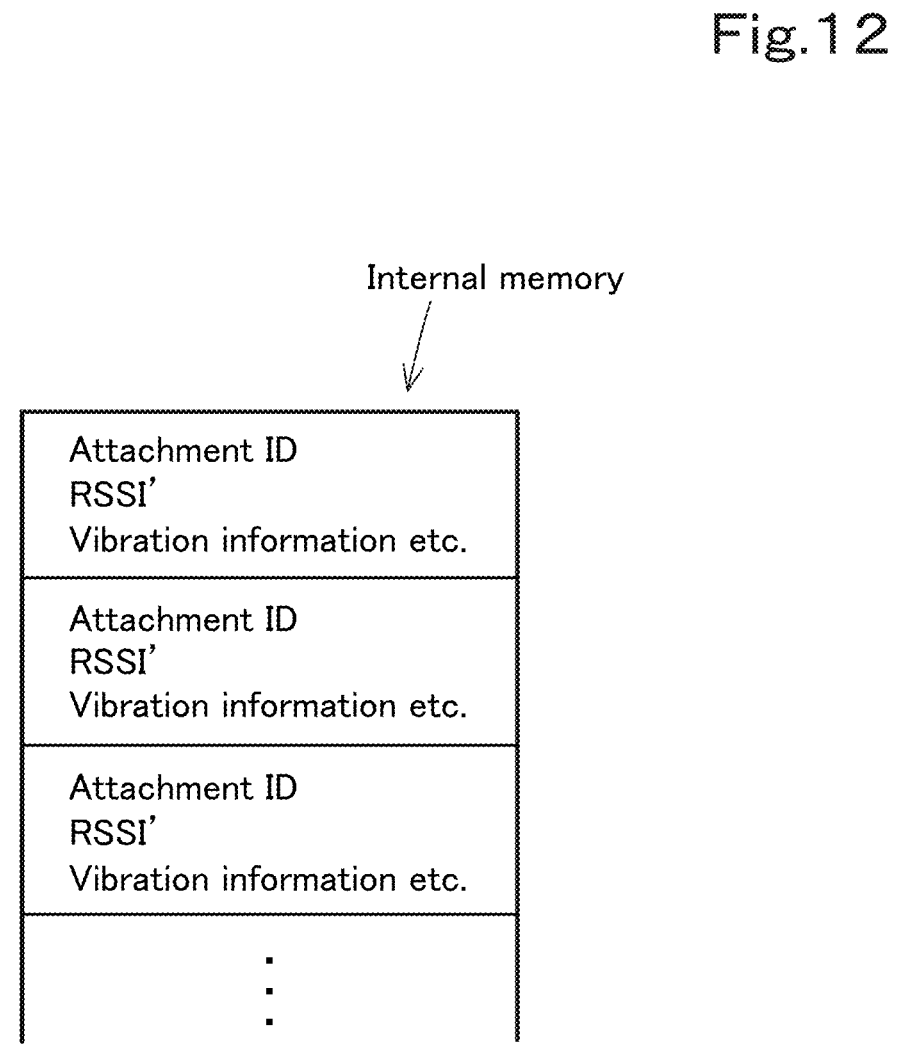

Internal memory

| |
| --- |
| Attachment ID<br>RSSI'<br>Vibration information etc. |
| Attachment ID<br>RSSI'<br>Vibration information etc. |
| Attachment ID<br>RSSI'<br>Vibration information etc. |
| . <br> . <br> . |

<Securing-of-attachment recognizing process>

Fig.14

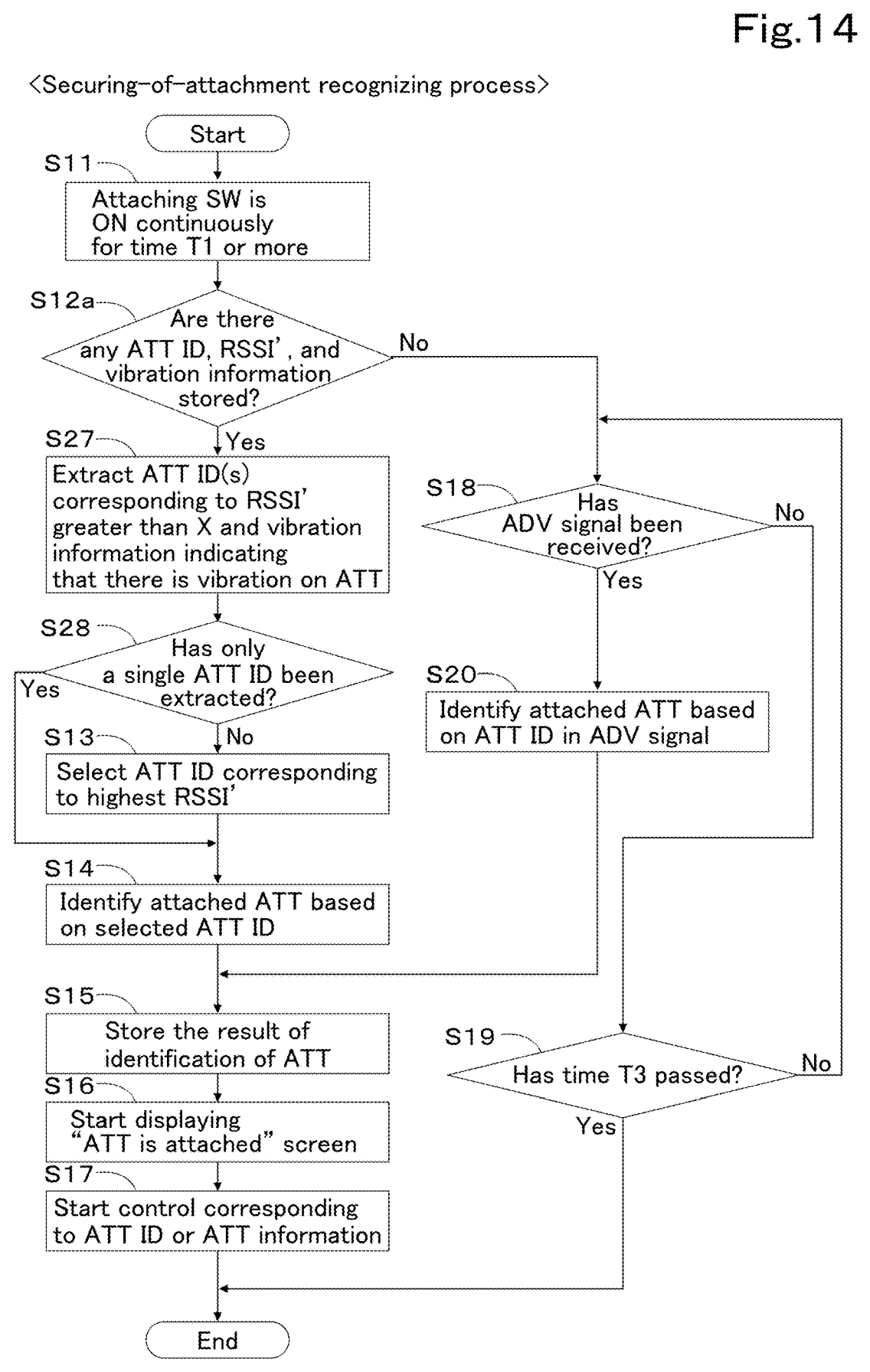

\<Securing-of-attachment recognizing process\>

```
                    ┌─────────┐
                    │  Start  │
                    └────┬────┘
                         │
  S11 ──┐    ┌───────────▼───────────┐
        │    │ Attaching SW is       │
        │    │ ON continuously       │
        │    │ for time T1 or more   │
             └───────────┬───────────┘
                         │
  S12a ──┐          ┌────▼────┐
         │       Are there              No
         │   any ATT ID, RSSI', and ─────────────────┐
         │    vibration information              │
              stored?                             │
                         │ Yes                    │
  S27 ──┐    ┌───────────▼───────────┐            │
        │    │ Extract ATT ID(s)     │  S18 ──┐   │
        │    │ corresponding to RSSI'│      Has      ◄───┐
        │    │ greater than X and    │   ADV signal been     No
        │    │ vibration             │    received? ───────────┐
        │    │ information indicating │        │            │  │
        │    │ that there is vibration on ATT  │ Yes        │  │
             └───────────┬───────────┘         │            │  │
  S28 ──┐                │            S20 ──┐   │            │  │
   Yes       Has only              ┌────────▼────────────┐  │  │
   ◄──── a single ATT ID been      │ Identify attached   │  │  │
        extracted?                 │ ATT based on ATT ID │  │  │
              │                    │ in ADV signal       │  │  │
  S13 ──┐     │ No                 └─────────┬───────────┘  │  │
     ┌──▼─────────────────┐                  │              │  │
     │ Select ATT ID      │                  │              │  │
     │ corresponding      │                  │              │  │
     │ to highest RSSI'   │                  │              │  │
     └────────┬───────────┘                  │              │  │
              │                              │              │  │
  S14 ──┐     │                              │              │  │
     ┌──▼─────────────────┐                  │              │  │
     │ Identify attached  │                  │              │  │
     │ ATT based          │                  │              │  │
     │ on selected ATT ID │                  │              │  │
     └────────┬───────────┘                  │              │  │
              │◄───────────────────────────┘               │  │
  S15 ──┐     │                                             │  │
     ┌──▼─────────────────┐   S19 ──┐                       │  │
     │ Store the result of│                                 │  │
     │ identification of ATT       Has time T3 passed?  No ─┘  │
  S16 └────────┬───────────┘           │                      │
     ┌─────────▼──────────┐            │ Yes                  │
     │ Start displaying   │            └──────────────────────┘
     │ "ATT is attached" screen│
  S17 └────────┬───────────┘
     ┌─────────▼──────────┐
     │ Start control      │
     │ corresponding      │
     │ to ATT ID or ATT information│
     └────────┬───────────┘
              │
         ┌────▼────┐
         │   End   │
         └─────────┘
```

<Securing-of-attachment recognizing process>

<Selection-of-attachment confirming process>

<Selection-of-attachment confirming process>

<Attachment information collecting process>

Fig.19

| Attachment ID | Correction value (second correction value) |
|---|---|
| ATT0001 | ***% |
| ATT0002 | ***% |
| ATT0003 | ***% |
| ⋮ | ⋮ |

<Securing-of-attachment recognizing process>

<Selection-of-attachment confirming process>

\<Selection-of-attachment confirming process\>

<Securing-of-attachment recognizing process>

WORKING VEHICLE AND ATTACHMENT USAGE SYSTEM

BACKGROUND OF THE INVENTION

1. Field of the Invention

The present invention relates to techniques for using attachments on working vehicles.

2. Description of the Related Art

For example, the specification of U.S. Patent Application Publication No. 2022/412040 discloses a system to automatically determine the positions of attachments in the vicinity of a working vehicle. The system is such that a first communication unit (tool module) including a first acceleration sensor is provided on an attachment such as a bucket, a quick changer configured to quickly and simply attach and detach the attachment thereto and therefrom is provided at the distal end of the boom of the working vehicle (excavator), a second communication unit (receiving module) including a second acceleration sensor is provided at the quick changer, and the working vehicle is provided with an identification module and a controller.

The first communication unit transmits, to the second communication unit via a near field communication such as RFID or Bluetooth (registered trademark) Low Energy, a first acceleration signal relating to the instantaneous acceleration of the attachment detected by the first acceleration sensor and an identifying signal of the attachment. The second communication unit transmits, to the identification module, the first acceleration signal and the identifying signal received from the first communication unit and the second acceleration signal relating to the instantaneous acceleration of the quick changer detected by the second acceleration sensor. The identification module identifies the attachment attached to the quick changer based on the comparison (e.g., difference) between the first acceleration signal and the second acceleration signal received from the second communication unit and on the received signal strength of the first acceleration signal, and transmits the identification information of the attachment to the controller. The controller performs an appropriate operation (work operation) of the working vehicle based on the received identifying signal.

However, with the existing system as described above, although the distance between the quick changer and the attachment is determined based on the received signal strength of the first acceleration signal, there may be cases in which, if how the first communication unit is attached differs from one attachment to another or if the received signal strengths of the first acceleration signals from the first communication units of the attachments are different from each other, the received signal strength of the first acceleration signal received by the second communication unit may vary even if the distance between the quick changer and the attachment is the same.

SUMMARY OF THE INVENTION

Example embodiments of the present invention make it possible to accurately detect attachments attached to linkages.

A working vehicle according to an aspect of an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the linkage based on the one or more pieces of identification information included in the one or more wireless signals received by the receiver and on one or more received signal strengths of the one or more wireless signals, and perform a predetermined process based on the selected piece of identification information, wherein the controller is configured or programmed to correct the one or more received signal strengths based on the one or more pieces of identification information, and select the piece of identification information of the attachment attached to the linkage based on the corrected one or more received signal strengths.

A working vehicle according to an aspect of an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select a piece of identification information of the attachment attached to the linkage based on the one or more pieces of identification information included in the one or more wireless signals received by the receiver and on one or more received signal strengths of the one or more wireless signals, and perform a predetermined process based on the selected piece of identification information, wherein the one or more transmitters are operable to transmit the one or more wireless signals including one or more correction values to correct the one or more received signal strengths, and the controller is configured or programmed to correct the one or more received signal strengths using the one or more correction values included in the one or more wireless signals, and select the piece of identification information of the attachment attached to the linkage based on the corrected one or more received signal strengths.

The controller may be configured or programmed to correct the one or more received signal strengths using one or more correction values corresponding to the one or more pieces of identification information.

The one or more correction values may be defined according to the one or more attachments corresponding to the one or more pieces of identification information.

The one or more correction values may be defined according to one or more types of the one or more attachments corresponding to the one or more pieces of identification information.

The working vehicle may further include a memory and/or a storage to store a table in which the one or more correction values and the one or more pieces of identification information are associated with each other. The controller may be configured or programmed to acquire the one or more correction values based on the one or more pieces of identification information included in the one or more wireless signals received by the receiver and on the table stored in the memory and/or the storage.

The linkage may include a hitch to attach and detach the attachment thereto and therefrom. The controller may be configured or programmed to cause a memory to store, for a period of time, the one or more pieces of identification information included in the one or more wireless signals received by the receiver. The controller may be configured or programmed to, when the attachment is attached to the hitch, perform the predetermined process based on one of the one or more pieces of identification information that (i) is stored in the memory and (ii) is included in one of the one or more wireless signals that is highest in corrected received signal strength.

The working vehicle may further include a machine body including the receiver therein or thereon, and a position changer including the linkage to change a relative position of the linkage to the machine body. The controller may be configured or programmed to, in a case that the attachment is attached to the linkage, further correct, based on the relative position, the corrected received signal strength of the wireless signal transmitted from the transmitter in or on the attachment.

A working vehicle according to an aspect of an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select, as a piece of identification information of the attachment attached to the linkage, one of the one or more pieces of identification information that is included in a wireless signal, having a received signal strength equal to or higher than a threshold, of the one or more wireless signals received by the receiver, and perform a predetermined process based on the selected piece of identification information, wherein the controller is configured or programmed to correct the threshold based on each of the one or more pieces of identification information to obtain one or more corrected thresholds, and select, as the piece of identification information of the attachment attached to the linkage, a piece of identification information included in one of the one or more wireless signals that has a received signal strength equal to or higher than a corresponding one of the one or more corrected thresholds.

A working vehicle according to an aspect of an example embodiment of the present invention includes a linkage to attach and detach an attachment thereto and therefrom, a receiver to receive one or more wireless signals which are transmitted periodically from one or more transmitters in or on one or more of the attachments, which include respective one or more pieces of identification information of the one or more attachments, and which are compliant with a near field communication standard, and a controller configured or programmed to select, as a piece of identification information of the attachment attached to the linkage, one of the one or more pieces of identification information that is included in a wireless signal, having a received signal strength equal to or higher than a threshold, of the one or more wireless signals received by the receiver, and perform a predetermined process based on the selected piece of identification information, wherein the one or more transmitters are operable to transmit the one or more wireless signals including one or more correction values to correct the threshold, and the controller is configured or programmed to correct the threshold using each of the one or more correction values included in the one or more wireless signals to obtain one or more corrected thresholds, and select, as the piece of identification information of the attachment attached to the linkage, a piece of identification information included in one of the one or more wireless signals that has a received signal strength equal to or higher than a corresponding one of the one or more corrected thresholds.

The controller may be configured or programmed to correct the threshold using each of one or more correction values corresponding to the one or more pieces of identification information.

The one or more correction values may be defined according to the one or more attachments corresponding to the one or more pieces of identification information.

The one or more correction values may be defined according to one or more types of the one or more attachments corresponding to the one or more pieces of identification information.

The working vehicle may further include a memory and/or a storage to store a table in which the one or more correction values and the one or more pieces of identification information are associated with each other. The controller may be configured or programmed to acquire the one or more correction values based on the one or more pieces of identification information included in the one or more wireless signals received by the receiver and on the table stored in the memory and/or the storage.

The working vehicle may further include a machine body including the receiver therein or thereon, and a position changer including the linkage to change a relative position of the linkage to the machine body. The controller may be configured or programmed to further correct a corresponding one of the one or more corrected thresholds based on the relative position at a point in time at which the wireless signal is received by the receiver.

An attachment usage system according to an aspect of an example embodiment of the present invention includes a linkage on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, and a receiver in or on the working vehicle to receive the one or more wireless signals transmitted from the one or more transmitters, and a controller configured or programmed to select a piece of identification information of the attachment attached to the linkage based on the one or more pieces of identification information included in the one or more wireless signals received by the receiver and on one or more received signal strengths of the one or more wireless signals, and perform a predetermined process based on the selected piece of identification information, wherein the controller is configured or programmed to correct the one or more received signal strengths based on the one or more pieces of identification information, and select the piece of identification information of the attachment attached to the linkage based on the corrected one or more received signal strengths.

An attachment usage system according to an aspect of an example embodiment of the present invention includes a linkage on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, and a receiver in or on the working vehicle to receive the one or more wireless signals transmitted from the one or more transmitters, and a controller configured or programmed to select a piece of identification information of the attachment attached to the linkage based on the one or more pieces of identification information included in the one or more wireless signals received by the receiver and on one or more received signal strengths of the one or more wireless signals, and perform a predetermined process based on the selected piece of identification information, wherein the one or more transmitters are operable to transmit the one or more wireless signals including one or more correction values to correct the one or more received signal strengths, and the controller is configured or programmed to correct the one or more received signal strengths using the one or more correction values included in the one or more wireless signals, and select the piece of identification information of the attachment attached to the linkage based on the corrected one or more received signal strengths.

An attachment usage system according to an aspect of an example embodiment of the present invention includes a linkage on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, and a receiver in or on the working vehicle to receive the one or more wireless signals transmitted from the one or more transmitters, and a controller configured or programmed to select, as a piece of identification information of the attachment attached to the linkage, one of the one or more pieces of identification information that is included in a wireless signal, having a received signal strength equal to or higher than a threshold, of the one or more wireless signals received by the receiver, and perform a predetermined process based on the selected piece of identification information, wherein the controller is configured or programmed to correct the threshold based on each of the one or more pieces of identification information to obtain one or more corrected thresholds, and select, as the piece of identification information of the attachment attached to the linkage, a piece of identification information included in one of the one or more wireless signals that has a received signal strength equal to or higher than a corresponding one of the one or more corrected thresholds.

An attachment usage system according to an aspect of an example embodiment of the present invention includes a linkage on a working vehicle to attach and detach an attachment thereto and therefrom, one or more transmitters in or on one or more of the attachments to periodically transmit one or more wireless signals which include one or more pieces of identification information of the one or more attachments and which are compliant with a near field communication standard, and a receiver in or on the working vehicle to receive the one or more wireless signals transmitted from the one or more transmitters, and a controller configured or programmed to select, as a piece of identification information of the attachment attached to the linkage, one of the one or more pieces of identification information that is included in a wireless signal, having a received signal strength equal to or higher than a threshold, of the one or more wireless signals received by the receiver, and perform a predetermined process based on the selected piece of identification information, wherein the one or more transmitters are operable to transmit the one or more wireless signals including one or more correction values to correct the threshold, and the controller is configured or programmed to correct the threshold using each of the one or more correction values included in the one or more wireless signals to obtain one or more corrected thresholds, and select, as the piece of identification information of the attachment attached to the linkage, a piece of identification information included in one of the one or more wireless signals that has a received signal strength equal to or higher than a corresponding one of the one or more corrected thresholds.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

FIG. 3 is a diagram showing an example of the relationship between attachment IDs and their corresponding correction values (first correction values) according to the first example embodiment of the present invention.

FIG. 4 is a diagram showing an example of the relationship between attachment IDs and their corresponding pieces of display data according to the first example embodiment of the present invention.

FIG. 5 is a diagram showing an example of the relationship between attachment IDs and their corresponding pieces of control data according to the first example embodiment of the present invention.

FIG. 12 is a diagram showing another example of information stored in the internal memory of the controller according to the first example embodiment of the present invention.

FIG. 14 is a flowchart showing a further example of the securing-of-attachment recognizing process according to the first example embodiment of the present invention.

FIG. 19 is a diagram showing an example of the relationship between attachment IDs and their corresponding correction values (second correction values) according to a third example embodiment of the present invention.

DETAILED DESCRIPTION OF THE EXAMPLE EMBODIMENTS

Figure 1:
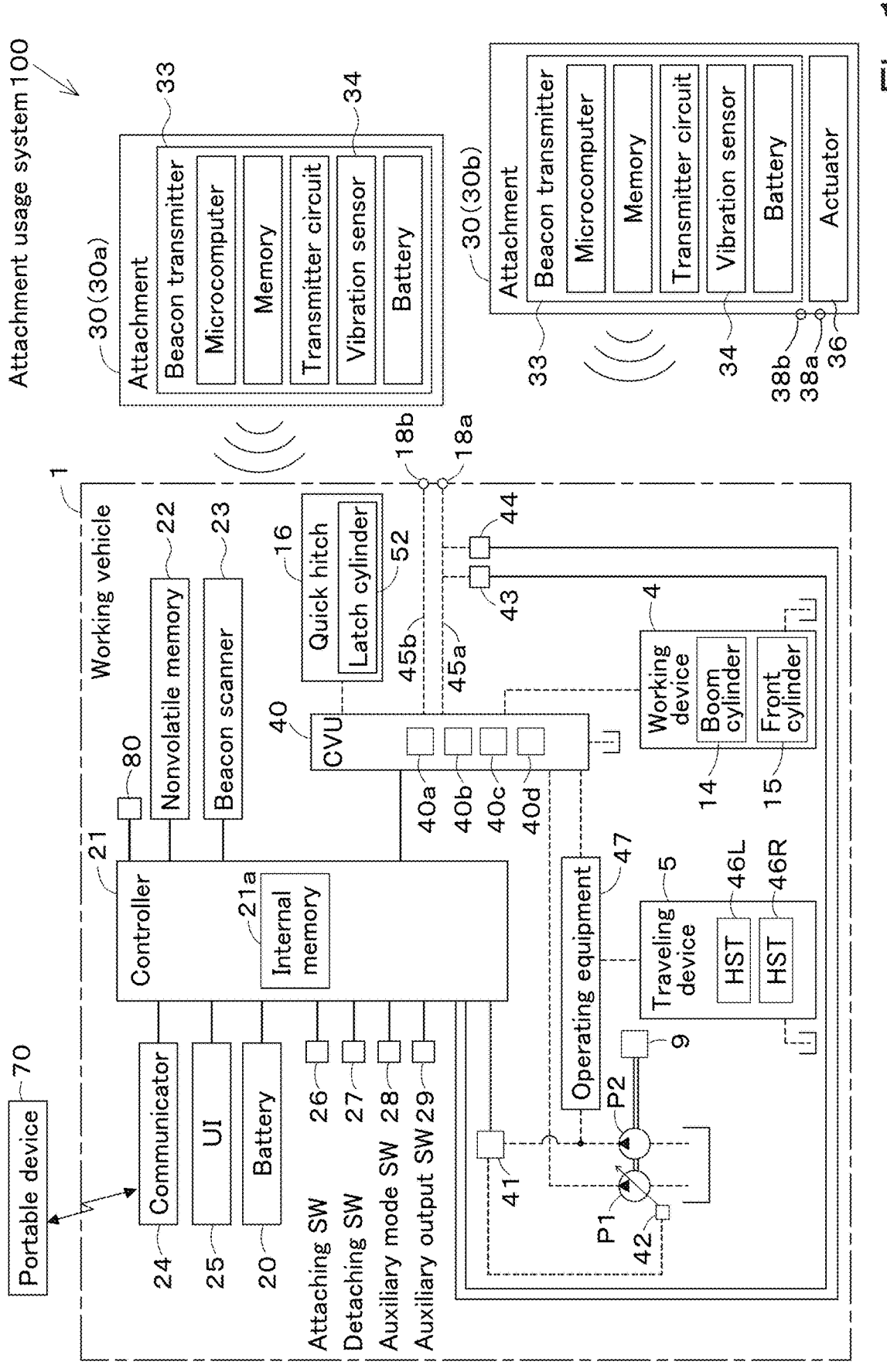
FIG. 1 is a block diagram of an attachment usage system and a working vehicle according to a first example embodiment of the present invention.

The example embodiments will now be described with reference to the accompanying drawings, wherein like reference numerals designate corresponding or identical elements throughout the various drawings. The drawings are to be viewed in an orientation in which the reference numerals are viewed correctly.

The following description discusses example embodiments of the present invention with reference to the drawings as needed.

First Example Embodiment

Figure 24:
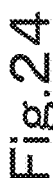
FIG. 24 is a side view of a working vehicle.

FIG. 24 is a side view of a working vehicle 1 according to the present example embodiment. In the present example embodiment, a compact track loader is discussed as an example of the working vehicle 1. Note, however, that the working vehicle according to an example embodiment of the present invention is not limited to a compact track loader, and may be, for example, some other construction machine or agricultural machine such as a skid-steer loader, a backhoe, or a tractor.

The working vehicle 1 includes a machine body 2, a cabin 3, a working device 4, and traveling device(s) 5. The cabin 3 is provided on the machine body 2. The cabin 3 includes an operator's seat 8, operation members (manual operators) to be operated by an operator seated on the operator's seat

8, and/or the like. The operation members include a travel operation member 6 to operate the traveling devices 5 and a work operation member 7 to operate the working device 4.

The traveling devices 5 are provided on the left and right sides of the machine body 2 and support the machine body 2 such that the machine body 2 is allowed to travel. The traveling devices 5 may be crawler traveling devices, for example. The operator operates the travel operation member 6 to cause both the left and right traveling devices 5 to rotate in a forward direction, both the left and right traveling devices 5 to rotate in a reverse direction, only one of the left and right traveling devices 5 to rotate in the forward direction, or one of the left and right traveling devices 5 to rotate in the forward direction and the other to rotate in the reverse direction to cause the machine body 2 (working vehicle 1) to travel forward, rearward, or turn left or right.

The working device 4 is attached to the machine body 2. The working device 4 includes an attachment 30, a linkage 16, and a position changer C. The attachment 30 is, for example, a working tool such as a bucket 30a, which can be attached to and detached from the linkage 16. Examples of the attachment 30 other than the bucket 30a include earth augers, angle brooms, crushers, grapples, cold planers, sweepers, skid cutters, skid graders, stump grinders, snow blowers, snow pushers, spreaders, dozer blades, trenchers, breakers, pallet forks, hopper brooms, mowers, rippers, loader booms, and rotary tillers. Attachments 30 of each type may have different specifications such as work done, structures, sizes and/or shapes.

The linkage 16 is operable to attach and detach the attachment 30 thereto and therefrom, and is included in the position changer C. The position changer C includes the linkage 16, and is operable to change the relative position of the linkage 16 to the machine body 2. The position changer C includes a first end (rear end) connected to the machine body 2, and a second end (front end) including the linkage 16. The position changer C is operable to, for example, raise and lower the linkage 16 to change the relative position of the linkage 16 to the machine body 2 to change the position of the attachment 30 linked to the linkage 16.

In the present example embodiment, the position changer C includes boom(s) 11, lift link(s) 12, control link(s) 13, boom cylinder(s) 14, and front cylinder(s) 15. The booms 11, the lift links 12, the control links 13, the boom cylinders 14, and the front cylinders 15 are provided at the left and right of the cabin 3. The left and right booms 11 are connected to each other by a connector 17 at an intermediate portion of their front portion. The left boom 11 has, at the front portion thereof, a hydraulic fluid outlet port (power output port) 18a and a hydraulic fluid inlet port 18b.

The lift links 12 and the control links 13 support proximal portions (rear portions) of the booms 11 via shafts such that the booms 11 are swingable up and down. The boom cylinders 14 each have one end thereof pivotally connected to a corresponding one of the booms 11 via a shaft and the other end thereof pivotally connected to a lower rear portion of the machine body 2 via a shaft. Upon operation of the work operation member 7 along a first direction by the operator of the working vehicle 1, the boom cylinders 14 extend or retract and the booms 11 ascend or descend (swing upward or downward).

Note that the position changer C described above is an example, and this does not imply any limitation. For example, in a case that the working vehicle is a backhoe, the position changer C includes an arm, a boom, and the like. In a case that the working vehicle is a tractor, the position changer C is a lifting device such as a three-point linkage.

The following details the linkage 16. The linkage 16 includes, for example, a quick hitch (hitch) to attach and detach the attachment 30. The quick hitch 16 is provided at distal ends of the booms 11. The operator of the working vehicle 1 can easily change attachments 30 using the quick hitch 16. The quick hitch 16 is therefore also called "quick changer". In the example shown in FIG. 24, the bucket 30a, which is an example of the attachment 30, is attached to a front portion of the quick hitch 16.

The quick hitch 16 has, connected to a rear portion thereof, the distal ends of the booms 11 and ends of the front cylinders 15 via respective shafts such that the booms 11 and the front cylinders 15 are pivotable. The opposite ends of the front cylinders 15 are pivotally connected to the connector 17 via shafts. Upon operation of the work operation member 7 along a second direction by the operator, the front cylinders 15 extend or retract and the quick hitch 16 swings upward or downward. With this, the bucket 30a attached to the quick hitch 16, swinging upward or downward, performs shoveling or dumping.

Figure 25:
FIG. 25 is an elevational view of a quick hitch.
Figure 26A:
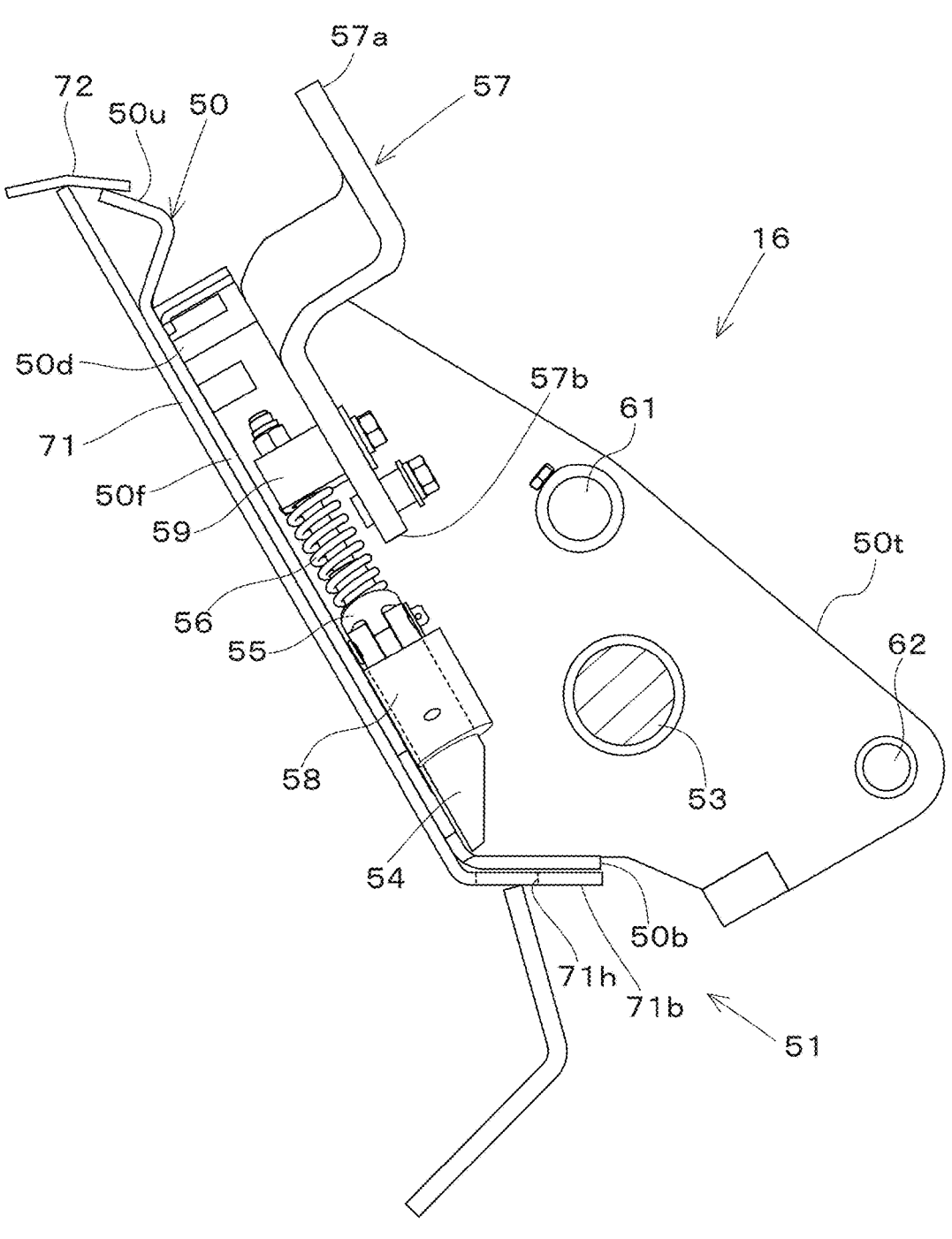
FIG. 26A is a side view of an attachment unlatched by a quick hitch.
Figure 26B:
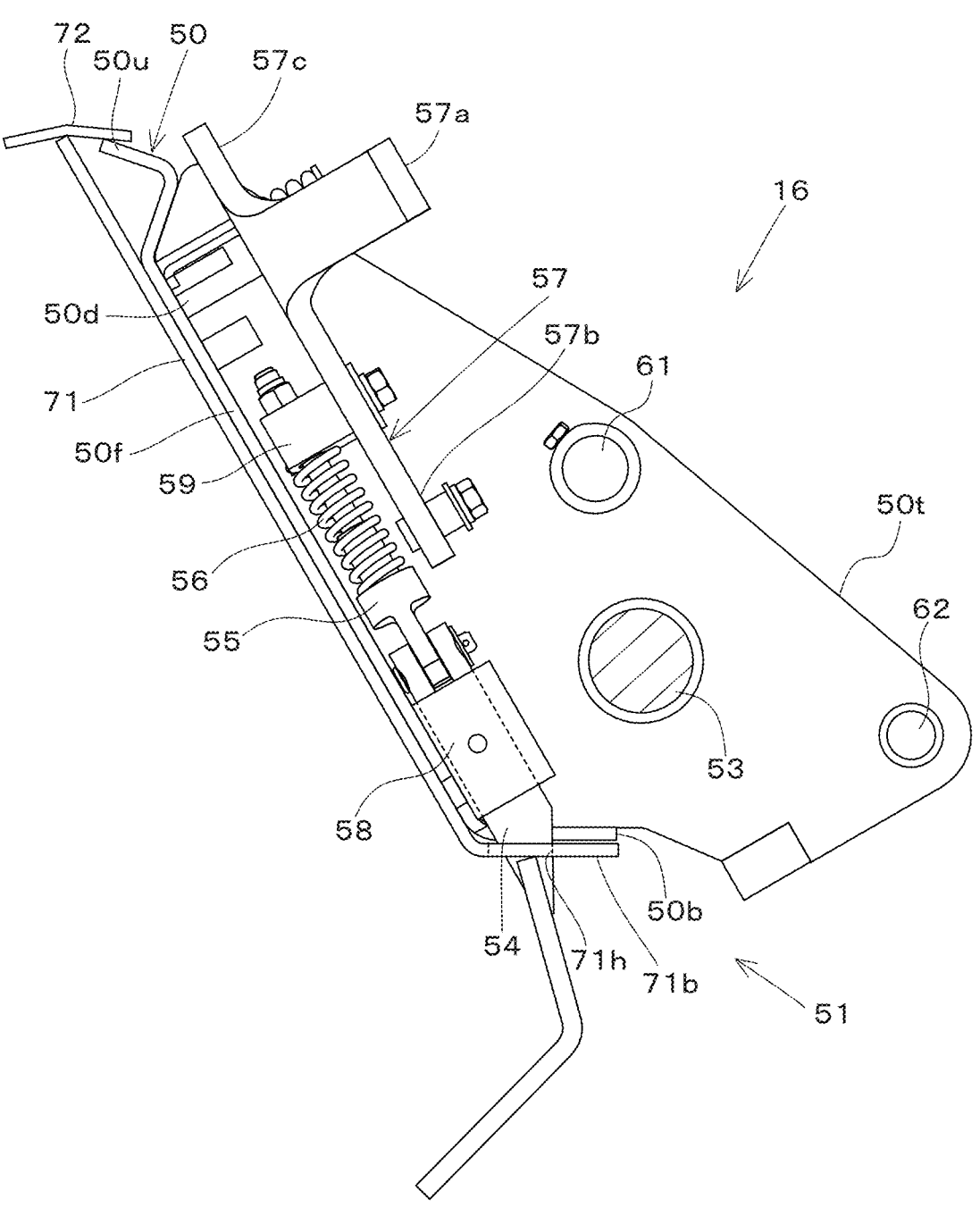
FIG. 26B is a side view of an attachment latched by a quick hitch.

FIG. 25 is an elevational view of the quick hitch 16. Specifically, FIG. 25 illustrates the quick hitch 16 in FIG. 24 as viewed from the machine body 2 of the working vehicle 1. FIG. 26A is a side view illustrating the quick hitch 16 in an unlatching state. FIG. 26B is a side view illustrating the quick hitch 16 in a latching state.

The quick hitch 16 includes a pair of left and right brackets 50, a pair of left and right latching mechanisms 51, a latch cylinder 52, and the like. The brackets 50 hold the attachment 30. The latching mechanisms 51 are selectively operable in a latching state in which the attachment 30 is secured to the brackets 50 (quick hitch 16) or an unlatching state in which the attachment 30 is allowed to be detached from the brackets 50. The latch cylinder 52 is a latch actuator to place the latching mechanisms 51 selectively in the latching state or the unlatching state.

As illustrated in FIG. 26A, each of the brackets 50 includes a front plate 50f and a pair of connector plates 50t projecting rearward from the front plate 50f. The connector plates 50t have pivotally connected thereto the distal ends of the left and right booms 11 (FIG. 24) via shafts 61, and have pivotally connected thereto ends of the left and right front cylinders 15 (FIG. 24) via shafts 62. The connector plates 50t are connected to a beam 53, so that the pair of brackets 50 are combined.

The front plate 50f of each of the brackets 50 includes an upper portion 50u bent in the form of the letter V as illustrated in FIG. 26A. The front plate 50f includes a lower portion 50b bent such that the lower portion 50b projects diagonally rearward. A top plate 72 bent downward is provided above a base plate 71 of the attachment 30. The base plate 71 includes a lower portion 71b bent such that the lower portion 71b projects diagonally rearward. The lower portion 71b of the base plate 71 has a through-hole 71h.

The upper portions 50u of the front plates 50f of the brackets 50 are inserted into the gap between the base plate 71 and the top plate 72 of the attachment 30 and engage with the back surface of the top plate 72, the front surfaces of the front plates 50f engage with the base plate 71, and the lower portions 50b of the front plates 50f engage with the lower portion 71b of the base plate 71. With this, the attachment 30 is held by the brackets 50.

The latching mechanisms 51 are located inward of the connector plates 50t of the brackets 50 in FIG. 25. Each of the latching mechanisms 51 includes, as illustrated in FIG. 26A, a latch pin 54, a link 55, a coil spring 56, a latch lever 57, and the like. The latch pin 54 is held by a housing 58 fixed to a corresponding bracket 50 such that the latch pin 54 is movable up and down. The latch pin 54 includes a lower portion projecting downward from the housing 58, and the lower portion has an inclined surface sloping diagonally forward and downward. The latch pin 54 includes an upper portion rotatably connected to a lower end portion of the link 55 via pin(s). The link 55 is inserted in the coil spring 56. The link 55 includes an upper end portion projecting from the coil spring 56, and the upper end portion is held by a holder 59.

Each latch lever 57 is substantially in the form of the letter L as illustrated in FIG. 25. The latch lever 57 includes a bent intermediate portion which is rotatably connected to a mount 50d on a corresponding bracket 50 via pin(s) as illustrated in FIG. 26A. The latch lever 57 includes a first projecting portion 57a which projects inward from corresponding connector plates 50t as illustrated in FIG. 25. The latch lever 57 includes a second projecting portion 57b projecting downward. The second projecting portion 57b has, connected to a back surface of a central portion thereof, the holder 59 via pin(s) as illustrated in FIG. 26A. The latch lever 57 includes a third projecting portion 57c which projects upward as illustrated in FIG. 25.

The latch cylinder 52 is a hydraulic cylinder which is positioned laterally and located above the beam 53. The latch cylinder 52 has a first end (distal end of the rod) pivotally connected to the distal end portion of the second projecting portion 57b of one of the latch levers 57 (right latch lever 57 in FIG. 25) via pin(s). The latch cylinder 52 has a second end (bottom of the cylinder case) pivotally connected to the distal end portion of the second projecting portion 57b of the other of the latch levers 57 (the left latch lever 57 in FIG. 25) via pin(s).

The retraction of the latch cylinder 52, as indicated by dot-dot-dash lines in FIG. 25, causes the second projecting portions 57b of the left and right latch levers 57 to approach each other, causing the latch levers 57 to pivot upward. Then, as illustrated in FIG. 26A, the links 55 and the latch pins 54 move upward and the latch pins 54 detach from the through-holes 71h in the base plate 71 of the attachment 30.

With this, the latching mechanisms 51 are located in their unlatching state (also referred to as "unlock state") in which the latching mechanisms 51 do not hold the attachment 30, allowing the attachment 30 to be detached from the quick hitch 16. The third projecting portions 57c of the latch levers 57 contact corresponding connector plates 50t of the brackets 50, so that the degree of retraction of the latch cylinder 52, the angle of upward rotation of the latch levers 57, and the degree of upward movement of the latch pins 54 are restricted.

Upon the extension of the latch cylinder 52 as indicated by solid lines in FIG. 25 from the state as illustrated in FIG. 26A, the second projecting portions 57b of the left and right latch levers 57 are pushed to cause the latch levers 57 to pivot downward. Upon such pivoting, the holders 59 cause the links 55 and the latch pins 54 to move downward and compress the coil springs 56. Then, as illustrated in FIG. 26B, the latch pins 54 are inserted in the through-holes 71h in the base plate 71 of the attachment 30, so that the inclined surfaces of the latch pins 54 contact the side walls of the through-holes 71h.

With this, the latching mechanisms 51 are located in their latching state (also referred to as "lock state") in which the latching mechanisms 51 hold the attachment 30, and the attachment 30 is attached to the quick hitch 16. The second projecting portions 57b of the latch levers 57 contact corresponding connector plates 50t of the brackets 50, so that the degree of extension of the latch cylinder 52, the angle of downward rotation of the latch levers 57, and the degree of downward movement of the latch pins 54 are restricted. It is noted here that the spring back force of the coil springs 56 holds the latch levers 57 in position. Since the first projecting portions 57*a* of the latch levers 57 are positioned horizontally, the operator seated on the operator's seat 8 of the working vehicle 1 confirms that the attachment 30 is attached to the quick hitch 16 (working vehicle 1) by looking at the horizontally positioned first projecting portions 57*a*.

Starting from the state as illustrated in FIG. 24 in which the bucket 30*a* is attached to the quick hitch 16, the bucket 30*a* is detached and another attachment 30 is attached to the quick hitch 16. This makes it possible to perform work other than excavation (or some other excavation work) using the other attachment 30.

FIG. 1 is a block diagram of an attachment usage system 100 and the working vehicle 1 according to the present example embodiment. The attachment usage system 100 includes the working vehicle(s) 1 and attachment(s) 30. The example in FIG. 1 includes one working vehicle 1 and two attachments 30, but the number of working vehicles 1 and the number of attachments 30 included in the attachment usage system 100 may be selected appropriately.

The working vehicle 1 includes a controller 21, one or more storing units (memory (memories) and/or storage(s)) 22, a receiver 23, a communicator 24, a user interface (indicated as "UI" in FIG. 1) 25, a battery 20, switches (each indicated as "SW" in FIGS. 1) 26 to 29, and/or the like.

The controller 21 may include a processing circuit including one or more processors. The controller 21 is a controller for the working vehicle 1 and is configured or programmed to perform various controls relating to the working vehicle 1. The controller 21 is communicably connected to devices in or on the working vehicle 1 via an in-vehicle network such as CAN, ISOBUS, LIN, and/or FlexRay.

The controller 21 may include one or more memories, analog circuit(s), digital circuit(s), and/or the like. The one or more memories store (record) software program(s) to be executed by one or more processors and/or various data. Specifically, a memory 21*a* (internal memory) of the one or more memories of the controller 21 is a volatile memory or a nonvolatile memory. The controller 21 may, for example, use a predetermined storage area of the memory 21*a*, which is a volatile memory, as a buffer for temporary storage of information and data.

The controller 21 has the storing unit(s) 22 (nonvolatile memory) communicably connected thereto. The storing unit 22 is provided externally to the controller 21. The memory 21*a* and the storing unit 22 store software program(s) and control data for the controller 21 to control operation of the elements. The storing unit 22 stores pieces of control data corresponding to various attachments 30.

The controller 21 can include one or more processors to read software program(s) and control data from the storing unit 22 and perform various processes based on the software program(s) and the control data. Note that the controller 21 may include one or more processors to perform various processes based on predetermined logic circuit(s).

Examples of the processors include central processing unit (CPU), graphics processing unit (GPU), digital signal processor (DSP), field programmable gate array (FPGA), and application specific integrated circuit (ASIC).

Note that the controller 21 may include two or more physically separated processors cooperating to perform various processes, and the structure thereof is not limited to those described above. In such a case, the two or more processors are provided in or on the working vehicle 1 and one or more computers physically separated from the working vehicle 1, and are communicably connected to each other via a network such as an in-vehicle network, LAN, WAN, or the Internet.

The software program(s) may be stored in recording medium (media) (nonvolatile memory (memories) such as HDD, SSD, CD-ROM, and/or DVD-ROM) communicably connected to the controller 21 and/or external server device(s) connected to the controller 21 via a network, and may be installed from the medium, the server device, and/or the like into the memory.

The receiver 23 is a device to receive wireless signals compliant with a near field communication standard. Specifically, the receiver 23 may be a beacon scanner to receive wireless signals (beacon signals) compliant with Bluetooth (registered trademark) Low Energy which is a near field communication standard. The beacon scanner 23 measures the received signal strength indicator (RSSI, received signal strength) of the received wireless signals. Note that RSSI may be hereinafter simply referred to as received signal strength. The receiver 23 is provided in or on the machine body 2.

The communicator 24 communicates with a portable device 70 via the Internet or wireless LAN or the like. The portable device 70 may be a smartphone, a tablet computer, and/or the like. The user interface 25 includes, for example, a touchscreen (touch panel) and/or the like. For another example, the user interface 25 may include an input and an output provided independently of each other.

The battery 20 supplies electricity to electric equipment in and/or on the working vehicle 1. The attaching switch 26, the detaching switch 27, the auxiliary mode switch 28, and the auxiliary output switch 29 are respective operation switches to be operated by the operator of the working vehicle 1. The attaching switch 26 and the detaching switch 27 are momentary operation switches. The user interface 25 and the switches 26 to 29 are provided operably in the vicinity of the operator's seat 8 in the cabin 3.

The attaching switch (first operation switch) 26 is operated to attach the attachment 30 to the quick hitch 16. The detaching switch (second operation switch) 27 is operated to allow the attachment 30 to be detached from the quick hitch 16. The auxiliary mode switch 28 is operated to start an auxiliary mode in which predetermined attachment(s) 30 are usable. The auxiliary output switch (third operation switch) 29 is operated to supply (transmit) hydraulic fluid as power to the hydraulic fluid outlet port 18*a*.

The working vehicle 1 includes, as hydraulic-related features, a main pump P1, a pilot pump P2, a control valve unit (indicated as "CVU" in FIG. 1) 40, a proportional valve 41, a regulator 42, sensors 43 and 44, hydraulic actuators 14, 15, 46L, 46R, and 52, fluid passage(s), a tank, and/or the like. The main pump P1 and the pilot pump P2 are driven by power from a prime mover 9 to deliver hydraulic fluid sucked from the tank to fluid passage(s). The prime mover 9 includes, for example, an engine. For another example, the prime mover 9 may include an electric motor.

The main pump P1 may be a variable displacement hydraulic pump. The regulator 42 changes the angle of the swash plate of the main pump P1. The controller 21 may be configured or programmed to control the opening of the proportional valve 41 to apply pilot pressure, which is the hydraulic pressure of hydraulic fluid delivered by the pilot pump P2, to the regulator 42. The controller 21 then actuates the regulator 42 to change the angle of the swash plate of the main pump P1 to change the amount of hydraulic fluid delivered by the main pump P1. Operating equipment 47 includes the travel operation member 6 and the work operation member 7, operating valves corresponding to the travel operation member 6 and the work operation member 7, switching valve(s), and the like.

The control valve unit 40 allows hydraulic fluid supplied from the main pump P1 through fluid passage(s) to flow to the boom cylinders 14 and the front cylinders 15 of the working device 4, the latch cylinder 52 of the quick hitch 16, and the hydraulic fluid outlet port 18a. The control valve unit 40 also allows hydraulic fluid that flows from the boom cylinders 14, the front cylinders 15, the latch cylinder 52, and the hydraulic fluid inlet port 18b (return fluid) to be discharged. The control valve unit 40 controls the direction and amount of supply of hydraulic fluid to the boom cylinders 14, the front cylinders 15, and the latch cylinder 52. The control valve unit 40 also controls the amount of supply of hydraulic fluid to the hydraulic fluid outlet port 18a.

Specifically, the control valve unit 40 includes control valves 40a, 40b, 40c, and 40d corresponding to the boom cylinders 14, the front cylinders 15, the latch cylinder 52, and the ports 18a and 18b. Each of the control valves 40a, 40b, 40c, and 40d is switchable between a neutral position, a first position, and a second position. At least the control valves 40c and 40d of the control valves 40a, 40b, 40c, and 40d are electrically actuated. The control valves 40a, 40b, 40c, and 40d are normally held in the neutral position by the elastic force of a spring.

The operating valve(s) of the operating equipment 47 and/or the like that correspond to the work operation member 7 are actuated according to the manner in which the work operation member 7 is operated, thus allowing the pilot pressure of pilot fluid from the pilot pump P2 to act on pressure receiver(s) of the control valve(s) 40a and/or 40b. For example, the work operation member 7 may be supported on operating valve(s) of the operating equipment 47 and the operating valve(s) may be physically actuated by operation of the work operation member 7. Additionally or alternatively, a detection sensor to detect the amount (degree) and direction of operation of the work operation member 7 may be provided and the controller 21 may electrically actuate the operating valve(s) based on the detection result from the detection sensor. With this, the control valve(s) 40a and/or 40b is/are switched from the neutral position to the first position or the second position, so that hydraulic fluid from the main pump P1 is supplied through the control valve(s) 40a and/or 40b to the boom cylinders 14 and/or the front cylinders 15 to cause the boom cylinders 14 and/or the front cylinders 15 to extend or retract. It follows that the booms 11 and/or the attachment 30 such as the bucket 30a attached to the quick hitch 16 swing.

While the attaching switch 26 is being operated, the controller 21 places the control valve 40c in the first position to allow hydraulic fluid from the main pump P1 to be supplied to the latch cylinder 52 in the first direction to cause the latch cylinder 52 to extend. Accordingly, the operation of the attaching switch 26 that lasts for a first predetermined period of time T1 or more while the latching mechanisms 51 are in the unlatching state causes the latch cylinder 52 to extend to the predetermined degree or more, bringing the latching mechanisms 51 into the latching state. Even if the attaching switch 26 is operated, provided that the operation only lasts for a period less than the first predetermined period of time T1, the latch cylinder 52 does not extend to the predetermined degree or more and therefore the latching mechanisms 51 are not brought into the latching state.

Therefore, the latching mechanisms 51 are moved back by the spring back force of the coil springs 56 to the original unlatching state.

On the contrary, while the detaching switch 27 is being operated, the controller 21 places the control valve 40c in the second position to allow hydraulic fluid from the main pump P1 to be supplied to the latch cylinder 52 in a second direction opposite to the first direction to cause the latch cylinder 52 to retract. Accordingly, the operation of the detaching switch 27 that lasts for a second predetermined period of time T2 or more while the latching mechanisms 51 are in the latching state causes the latch cylinder 52 to retract to a predetermined degree or more, bringing the latching mechanisms 51 into the unlatching state. Even if the detaching switch 27 is operated, provided that the operation only lasts for a period less than the second predetermined period of time T2, the latch cylinder 52 does not retract to the predetermined degree or more and therefore the latching mechanisms 51 are not brought into the unlatching state. Therefore, the latching mechanisms 51 are moved back by the spring back force of the coil springs 56 to the original latching state.

The first predetermined period of time T1 and the second predetermined period of time T2 are each, for example, about 2 to 3 seconds. The first predetermined period of time T1 and the second predetermined period of time T2 may be the same period or different periods. The specific values of the first predetermined period of time T1 and the second predetermined period of time T2 are examples, and not limited to the values above. The same applies to a third predetermined period of time T3 and a period of time T4 (described later).

When the auxiliary mode switch 28 is operated and the auxiliary mode is selected, a specific attachment 30 is attached to the quick hitch 16. The hydraulic fluid outlet port 18a and a hydraulic fluid inlet port 38b of the specific attachment 30b are connected together by a hose, and the hydraulic fluid inlet port 18b and a hydraulic fluid outlet port 38a of the specific attachment 30b are connected together by a hose.

Upon operation of the auxiliary output switch 29 under such circumstances, the controller 21 switches the control valve 40d from the neutral position to the first position or the second position. With this, hydraulic fluid from the main pump P1 is supplied (transmitted) through a fluid passage 45a to the hydraulic fluid outlet port 18a, and hydraulic fluid flowing into a fluid passage 45b from the hydraulic fluid inlet port 18b is drained through the control valve unit 40.

With this, hydraulic fluid discharged through the hydraulic fluid outlet port 18a is introduced into the specific attachment 30b through the hydraulic fluid inlet port 38b via a hose or the like. Furthermore, hydraulic fluid (return fluid) discharged through the hydraulic fluid outlet port 38a of the specific attachment 30b is introduced through the hydraulic fluid inlet port 18b via a hose or the like and is drained from the control valve unit 40. Since hydraulic fluid is introduced and discharged to and from the specific attachment 30b as such, hydraulic actuators 36 such as a hydraulic motor and/or hydraulic cylinder(s) of the attachment 30b are actuated, making it possible to perform work using the attachment 30b.

When allowing hydraulic fluid to be introduced and discharged to and from the specific attachment 30b, the controller 21 changes the opening of the control valve 40d depending on what specific attachment 30b is attached to the quick hitch 16, to adjust the flow rate or hydraulic pressure of hydraulic fluid supplied to the hydraulic fluid outlet port 18a. For example, the controller 21 may cause the flow rate sensor 43 to detect the flow rate of hydraulic fluid flowing through the fluid passage 45a and control the opening of the control valve 40d. Additionally or alternatively, the controller 21 may cause the pressure sensor 44 to detect the hydraulic pressure of hydraulic fluid flowing through the fluid passage 45a and control the opening of the control valve 40d.

The pair of left and right traveling devices 5 include a pair of left and right hydro-static transmissions (HSTs) 46L and 46R corresponding to the pair of left and right traveling devices 5. Each of the HSTs 46L and 46R includes hydraulic pump(s) and a travel motor (hydraulic motor).

The operating valve(s) of the operating equipment 47 and/or the like that correspond to the travel operation member 6 are actuated according to the manner in which the travel operation member 6 is operated, so that a pilot pressure of pilot fluid from the pilot pump P2 acts on pressure receiver(s) of the swash plate(s) of the hydraulic pump(s) of the HST(s) 46L and/or 46R, thus changing the angle of inclination of the swash plate(s). For example, the travel operation member 6 may be supported on operating valve(s) of the operating equipment 47 and the operating valve(s) may be physically actuated by operation of the travel operation member 6. Additionally or alternatively, a detection sensor to detect the amount (degree) and direction of operation of the travel operation member 6 may be provided and the controller 21 may electrically actuate the operating valve(s) based on the detection result from the detection sensor. This controls the supply, the stopping of supply, and the direction of supply of hydraulic fluid from the hydraulic pump(s) of the HSTs 46L and/or 46R to the travel motor(s), the travel motor(s) rotate(s) in the forward direction, rotate in the reverse direction, or stop, the left and/or right traveling device(s) 5 also rotate(s) in the forward direction, rotate in the reverse direction, or stop, and the working vehicle 1 travels forward, rearward, turn left or right, or stops.

Furthermore, switching valve(s) for speed changes of the operating equipment 47 and/or like switch(es) positions according to control signal(s) from the controller 21, thus changing the angle of inclination of the swash plate(s) of the travel motor(s) of the HSTs 46L and/or 46R. With this, the rotation speed of the travel motor(s) increases or decreases, so that the travel speed of the traveling devices 5 and the working vehicle 1 is changed.

The attachment 30 attachable to the working vehicle 1 is provided with a transmitter 33. The transmitter 33 may be a beacon transmitter to periodically transmit a wireless signal compliant with a near field communication standard. Specifically, the beacon transmitter 33 is a device to periodically transmit an advertisement signal (also called "advertisement packet" or "beacon signal") which is a wireless signal compliant with Bluetooth (registered trademark) Low Energy. The beacon transmitter 33 looks like a small tag, and is therefore sometimes called a "BLE tag". The beacon transmitter 33 includes a microcomputer, a memory, a transmitter circuit, a battery, a vibration sensor 34, and/or the like. The elements of the beacon transmitter 33 are driven by electricity from the battery. The beacon transmitter 33 transmits the advertisement signal Q1 at interval(s) of, for example, about 1 second to about 3 seconds, but the intervals are not limited to 1 second to 3 seconds and may be selected as appropriate.

Figure 2:
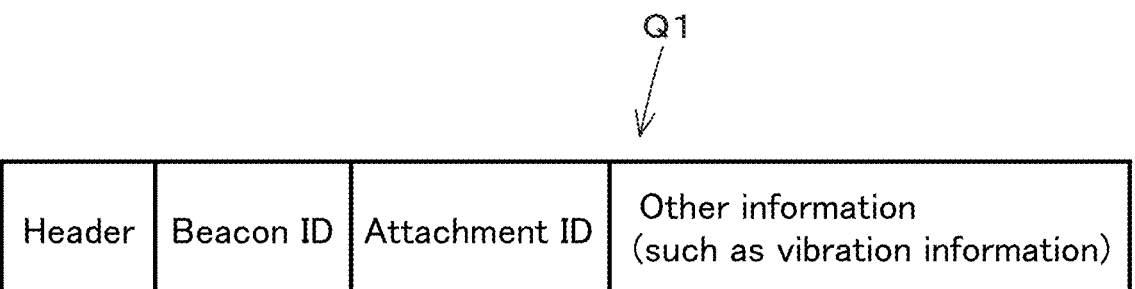
FIG. 2 is a diagram showing an example of information included in an advertisement signal according to the first example embodiment of the present invention.

FIG. 2 shows an example of information contained in an advertisement signal Q1 transmitted from the beacon transmitter 33. The advertisement signal Q1 includes a header, a beacon ID, an attachment ID, and other information. The beacon ID is identification information of the beacon transmitter 33 which is the sender of the advertisement signal Q1. The attachment ID is identification information of the attachment 30 in or on which the beacon transmitter 33 which is the sender of the advertisement signal Q1 is provided. Note that the attachment ID may be hereinafter simply referred to as identification information.

The other information in the advertisement signal Q1 includes vibration information relating to the vibration state detected by the vibration sensor 34 of the beacon transmitter 33 which is the sender, i.e., vibration information relating to the vibration state of the attachment 30 in or on which the beacon transmitter 33 is provided. The vibration information may include information such as a message indicating whether or not the attachment 30 is vibrating (presence or absence of vibration). The vibration information may include, instead of or in addition to the information such as a message, a vibration indicator (numerical value) indicating the magnitude of vibration detected by the vibration sensor 34. The vibration indicator may be, for example, at least one of the displacement, velocity, or acceleration of vibrations of the attachment 30 detected by the vibration sensor 34. Inertial sensor(s) such as an acceleration sensor and/or a gyroscope sensor may be used as the vibration sensor 34.

The beacon transmitter 33 is attached to a position on the attachment 30 that is specific to the attachment 30. The beacon transmitter 33 is attached to a position appropriate in terms of content of work done by the attachment 30, structure of the attachment 30, and/or the shape of the attachment 30. The beacon transmitter 33 is attached to a position at which the beacon transmitter 33 does not or is relatively unlikely to interfere with the operation of the attachment 30. The beacon transmitter 33 is attached to a position at which the beacon transmitter 33 does not or is relatively unlikely to contact an obstacle depending on the content of work done by the attachment 30. Thus, the beacon transmitter 33 is preferably attached to a portion of the attachment 30 that faces the machine body 2 of the working vehicle 1 (attached to a rear surface of the attachment 30).

The beacon transmitter 33 is attached to the attachment 30 via a connector such as bracket(s). The bracket is attached to a mount portion (e.g., hole) of the attachment 30 via a fastener such as bolt(s) and/or banding band(s). The same bracket is used for attachments 30 of the same model, and is attached to the same holes of the attachments 30 of the same model. Thus, the beacon transmitter 33 is attached to a position on the attachment 30 that is specific to the model of the attachment 30.

The hole for attachment of the fastener may be an existing hole in the attachment 30 or a hole made specifically for the bracket. Therefore, the beacon transmitter 33 may be surrounded by another element (such as a frame) of the attachment 30 depending on the content of work done by the attachment 30, the structure of the attachment 30, the shape of the attachment 30, and the position of the existing hole in the attachment 30.

Note that the manner in which the beacon transmitter 33 is attached is not limited to using a bracket, a fastener, or the like. The beacon transmitter 33 may be attached to the attachment 30 directly without using a bracket by screwing fastener(s) into hole(s) in the housing of the beacon transmitter 33 and hole(s) in the attachment 30.

The beacon scanner 23 is located at, for example, the front portion of the machine body 2 that faces the attachment 30. More specifically, as illustrated in FIG. 24, the beacon scanner 23 is provided on an upper portion of the front portion of the machine body 2 (on an upper portion of the cabin 3). The controller 21 is provided in the machine body 2. Since the beacon scanner 23 is provided in or on the machine body 2, it is possible to achieve a configuration in which output signals from the beacon scanner 23 can be inputted into the controller 21 using simple electric wiring or simple communication circuit(s) as compared to cases where the beacon scanner 23 is provided on the movable working device 4.

The advertisement signal Q1 transmitted from the beacon transmitter 33 is received by the beacon scanner 23 of the working vehicle 1. The controller 21 identifies (recognizes) the attachment 30 based on the attachment ID included in the advertisement signal Q1 received by the beacon scanner 23.

In the case where one or more attachments 30 are present in the vicinity of the working vehicle 1, one or more advertisement signals Q1 from one or more beacon transmitters 33 of the one or more attachments 30 are received by the beacon scanner 23. Upon receipt of each advertisement signal Q1, the beacon scanner 23 measures the RSSI of the advertisement signal Q1.

The controller 21 reads the one or more attachment IDs and one or more RSSIs from the one or more advertisement signals Q1 received by the beacon scanner 23. The controller 21, after acquiring the one or more attachment IDs and one or more RSSIs, corrects the RSSI(s) based on the attachment ID(s).

Specifically, the controller 21 corrects one or more RSSIs using one or more correction values corresponding to the one or more attachment IDs. The one or more correction values correspond to the one or more attachment IDs, and are defined according to the one or more attachments 30 corresponding to the one or more attachment IDs. Note that a correction value to correct an RSSI is hereinafter referred to as a first correction value for convenience of description.

FIG. 3 is a table showing an example of the relationship between attachment IDs and their corresponding first correction values. The controller 21 corrects an RSSI by multiplying the RSSI by a first correction value. In other words, the first correction value is a correction coefficient to correct the RSSI.

The first correction value is defined based on, for example, the actual magnitude of RSSI, measured by the beacon scanner 23, of an advertisement signal Q1 transmitted from the beacon transmitter 33 attached to each attachment 30 and received by the beacon scanner 23. For example, beacon transmitters 33 attached to respective attachments 30 are located at the same distance from the beacon scanner 23, and the RSSIs measured by the beacon scanner 23 are compared.

In a case that the measured RSSI here is higher than a predefined reference value, a first correction value to reduce the RSSI is defined for the attachment ID of the attachment 30 which has the corresponding beacon transmitter 33 attached thereto. On the contrary, in a case that the measured RSSI is lower than the reference value, a first correction value to increase the RSSI is defined for the attachment ID of the attachment 30 which has the corresponding beacon transmitter 33 attached thereto. Thus, the first correction value is defined by dividing the reference value by the RSSI so that the corrected RSSI approaches the reference value. That is, if the measured RSSI is the same or substantially same as the reference value, the first correction value for the attachment ID of the attachment 30 which has the corresponding beacon transmitter 33 attached thereto is "1". The RSSI having been corrected by the controller 21 using a first correction value is hereinafter referred to as RSSI'.

Such attachment IDs of attachments 30 and first correction values are associated with each other and stored, in the form of a table (first correction table), in a predetermined storage area of the storing unit 22. Thus, the controller 21 acquires one or more first correction values based on one or more attachment IDs included in one or more advertisement signals Q1 received by the beacon scanner 23 and on the first correction table stored in the storing unit 22.

Note that, in the above-described example, the controller 21 performs a process of correcting RSSI using a first correction value upon each acquisition of the attachment ID of an attachment 30, but the RSSI is substantially not corrected when the first correction value is "1". Therefore, when defining a first correction value, if the RSSI of an advertisement signal Q1 transmitted from a beacon transmitter 33 attached to an attachment 30 is the same or substantially same as the reference value, it is not necessary to define a first correction value. In so doing, upon acquiring the attachment ID of that attachment 30, the controller 21 may skip the process to correct the RSSI using a first correction value. In other words, the controller 21 need only correct RSSI only at least upon acquisition of at least one of specific attachment ID(s) (one or more attachment IDs) of the attachment IDs defined in the first correction table, and does not need to correct RSSIs for all the attachment IDs.

The first correction values in the first correction table stored in the storing unit 22 may be edited (changed) appropriately by the operator via the user interface 25 or the portable device 70 etc., and the operator may set a first correction value per attachment 30. In such a case, the operator may use the user interface 25 or the portable device 70 etc. to set a specific first correction value corresponding to the attachment ID of each attachment 30, and may select a level (level of received signal strength) so that the first correction value corresponding to that level is set.

In the above-described example, the first correction value is defined according to the attachment 30. The first correction value need only be defined based on at least the content of work done by the attachment 30, the structure of the attachment 30, the shape of the attachment 30, and/or the like, and may be defined according to the type of the attachment 30 corresponding to the attachment ID. In the present example embodiment, since the beacon scanner 23 is attached to an upper portion of the cabin 3, there are cases in which the RSSI of the advertisement signal Q1 received by the beacon scanner 23 from the beacon transmitter 33 attached at a high position is higher than the RSSI of the advertisement signal Q1 received by the beacon scanner 23 from the beacon transmitter 33 attached at a low position. To address this, for example, the first correction value for a pallet fork which has a beacon transmitter 33 attached at a relatively high position is smaller than the first correction value for a skid cutter which has a beacon transmitter 33 attached at a relatively low position.

In the above-described example, the controller 21 corrects RSSI by multiplying the RSSI by a first correction value, for example. Note, however, that the method of correcting RSSI using a first correction value is not limited to multiplication. The controller 21 may divide the RSSI by the first correction value, depending on how the first correction value is defined (in a case that the first correction value is defined by dividing the RSSI by the reference value). In cases where the first correction value is defined based on the difference between the reference value and RSSI, the controller 21 may correct the RSSI by adding or subtracting the first correction value to or from the RSSI. The method of correction is not limited to those described above. The controller 21 may correct RSSI using a function instead of the first correction value. In such a case, the function includes a variable corresponding to the attachment 30 or the type of the attachment 30.

Also in other methods of correction, when a first correction value or a function is defined, beacon transmitters 33 attached to respective attachments 30 are located at the same distance from the beacon scanner 23 and the first correction value or the function is defined so that each RSSI approaches the predetermined reference value, similarly to the earlier-described example. The first correction value or the function etc. may be defined using simulation results based on the position(s) of the beacon transmitter(s) 33 attached to the attachment(s) 30, the structure and/or shape of the attachment(s) 30, and/or the like.

The controller 21, after correcting the RSSIs, causes the internal memory (first memory) 21*a* to store the one or more attachment IDs read from the one or more advertisement signals Q1 and their associated RSSI's for a period of time T4, so that attachment IDs and the RSSI's are collected in the memory 21*a*.

When an attachment 30 is attached to the quick hitch 16, the controller 21 selects the attachment ID of the attachment 30 attached to the quick hitch 16 from the attachment IDs stored in the memory 21*a* based on the RSSI's. Specifically, the controller 21 selects the attachment ID corresponding to the highest RSSI' from the attachment IDs stored in the memory 21*a*. The controller 21 then identifies the specifications and/or the like of the attachment 30 attached to the quick hitch 16 based on the selected attachment ID, and starts a predetermined process according to the attachment ID.

An example of the predetermined process is a process in which the controller 21 causes the user interface 25 to output (display) information indicating that the attachment 30 corresponding to the selected attachment ID is attached to the quick hitch 16 (working vehicle 1). Another example of the predetermined process is a process in which the controller 21 controls an output of hydraulic fluid (power) to the attachment 30 attached to the quick hitch 16 (controls start and stop of the supply of hydraulic fluid to the attachment 30) according to the selected attachment ID. It is noted here that the controller 21 may also control at least one of the introduction of hydraulic fluid from the attachment 30, the amount of hydraulic fluid supplied to the attachment 30, or the pressure of hydraulic fluid supplied to the attachment 30.

With the attachment usage system 100, the controller 21 selects the ID of the attachment 30 attached to the quick hitch 16 from the attachment ID(s) stored in the memory 21*a* and starts a predetermined process according to the selected attachment ID. The controller 21 identifies the attachment 30 attached to the quick hitch 16 based on the attachment ID selected based on a predetermined condition from the attachment ID(s) stored in the memory 21*a*.

Display data and control data are pre-set for each of the attachment IDs of attachments 30 attachable to the quick hitch 16, i.e., attachments 30 which can be used with the working vehicle 1.

FIG. 4 is a table showing an example of the relationship between the attachment IDs of the attachments 30 attachable to the quick hitch 16 and pieces of display data corresponding to the attachments 30. A piece of display data is data based on which the user interface 25 displays information about a corresponding attachment 30. The display data includes, for example, an icon, name, and specifications of the corresponding attachment 30. Such an attachment ID and display data of the attachment 30 are stored in a predetermined storage area of the storing unit 22 such that the attachment ID and the display data of the attachment 30 are associated with each other. Note that display data other than that described above may be stored in the storing unit 22 such that the display data is associated with the attachment ID.

FIG. 5 is a table showing an example of the relationship between the attachment IDs of the attachments 30 attachable to the quick hitch 16 and pieces of control data corresponding to the attachments 30. A piece of control data indicates control performed by the working vehicle 1 according to what attachment 30 is used. The control data includes, for example, the level of the amount of hydraulic fluid supplied to the corresponding attachment 30. Such an attachment ID and control data of the attachment 30 are stored in a predetermined storage area of the storing unit 22 such that the attachment ID and the control data of the attachment 30 are associated with each other. Note that other control data, such as the level of hydraulic pressure outputted to the attachment 30 and/or the output value of power other than hydraulic fluid, may be stored in the storing unit 22 such that the control data is associated with the attachment ID.

Figure 6:
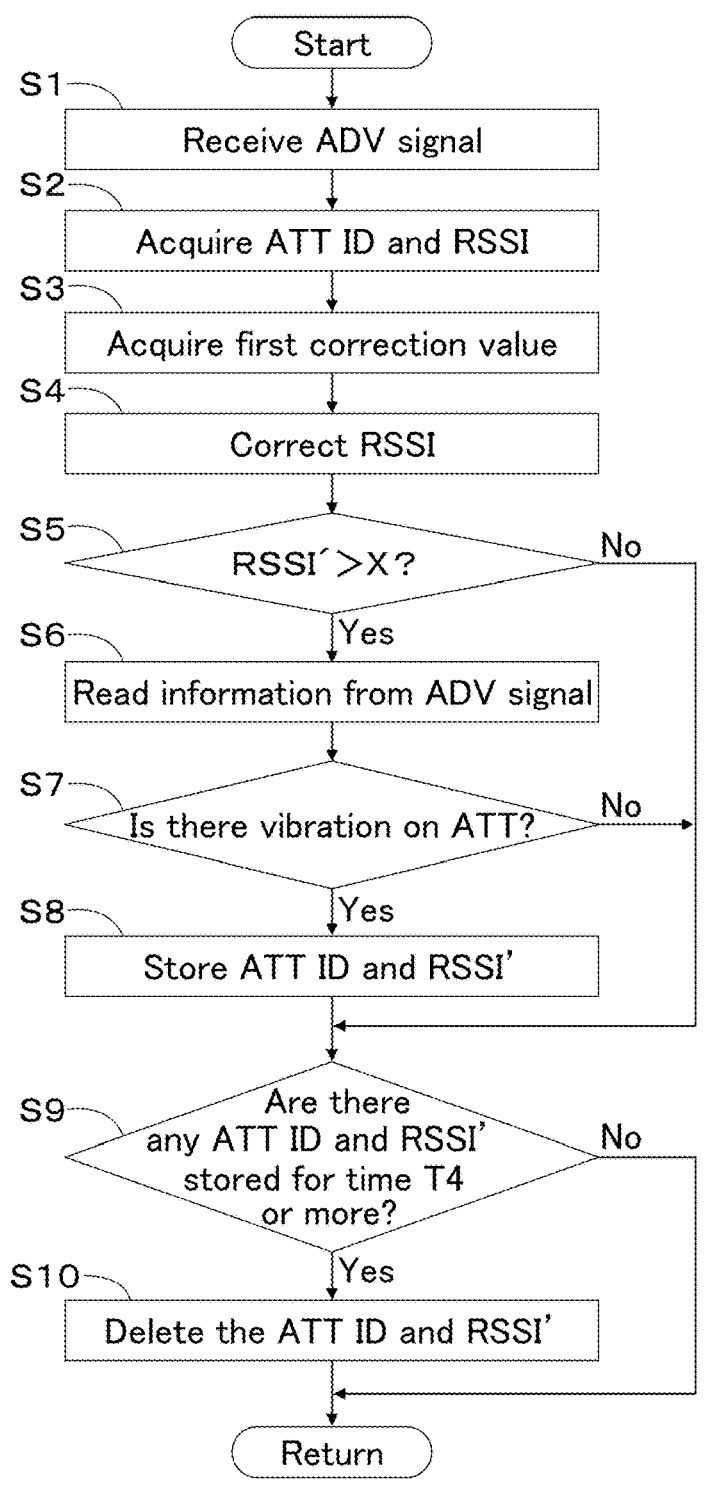
FIG. 6 is a flowchart showing an example of an attachment information collecting process according to the first example embodiment of the present invention.

FIG. 6 is a flowchart showing an example of an attachment information collecting process. The attachment information collecting process is performed by the controller 21 of the working vehicle 1 based on software program(s) stored in the memory 21*a* or the storing unit 22. The same applies to a securing-of-attachment recognizing process and a selection-of-attachment confirming process (described later). In FIG. 6, the advertisement signal Q1 is referred to as "ADV signal" and the attachment 30 is referred to as "ATT" for convenience of description. The same applies to FIGS. 8, 10 to 11, 13 to 18, and 20 to 23 (described later).

Upon receipt of an advertisement signal Q1 from the beacon transmitter 33 by the beacon scanner 23 (S1), the controller 21 acquires the attachment ID and RSSI of the advertisement signal Q1 from the beacon scanner 23 (S2).

The controller 21 refers to the first correction table stored in the storing unit 22 to acquire the first correction value corresponding to the acquired attachment ID (S3). The controller 21 corrects the RSSI using the acquired first correction value (S4).

Next, if the acquired RSSI' is greater than a predetermined value (first predetermined value) X (YES in S5), the controller 21 reads information from the received advertisement signal Q1 (S6).

Next, if the information read from the advertisement signal Q1 includes vibration information indicating that the attachment 30 is vibrating, the controller 21 determines that there is vibration on the attachment 30 (YES in S7). Alternatively, if the information read from the advertisement signal Q1 includes a vibration indicator and the vibration indicator is greater than a predetermined value (second predetermined value) Y, the controller 21 determines that there is vibration on the attachment 30 (YES in S7).

Next, the controller 21 causes the memory 21*a* to store the attachment ID included in the received advertisement signal Q1 and the RSSI' of the advertisement signal Q1 such that the attachment ID and the RSSI' are associated with each other (S8). It is noted here that the controller 21 causes the memory 21*a* to also store, for example, information relating to the time at which the attachment ID and the RSSI' were stored (such as a timestamp) such that the information is associated with the attachment ID and the RSSI'. The controller 21 may cause the memory 21*a* to also store, for example, a beacon ID and/or other information included in the received advertisement signal Q1 such that the beacon ID and/or the other information are associated with the attachment ID and the RSSI'.

In contrast, if the RSSI' is equal to or less than the predetermined value X (NO in S5), the controller 21 does not cause the memory 21a to store the attachment ID included in the received advertisement signal Q1 or the RSSI' of the advertisement signal Q1. Also if the received advertisement signal Q1 does not include vibration information indicating that the attachment 30 is vibrating (or the vibration indicator greater than the predetermined value Y) and it is determined that there is no vibration on the attachment 30 (NO in S7), the controller 21 does not cause the memory 21a to store the attachment ID included in the received advertisement signal Q1 or the RSSI' of the advertisement signal Q1.

If any of the attachment ID(s) or RSSI' (s) in the memory 21a has been stored for the period of time T4 or more (YES in S9), the controller 21 deletes that attachment ID(s) and RSSI' (s) from the memory 21a (S10). It is noted here that the controller 21 also deletes, from the memory 21a, other information (such as time information) corresponding to the attachment ID(s) having been stored for the period of time T4 or more. The period of time T4 is, for example, about 30 seconds which corresponds to at least one of the time for an attachment 30 to be attached to the working vehicle 1 or the time for the attachment 30 to be replaced with another one. After step S10, the controller 21 repeats step S1 and subsequent steps.

Figure 7:
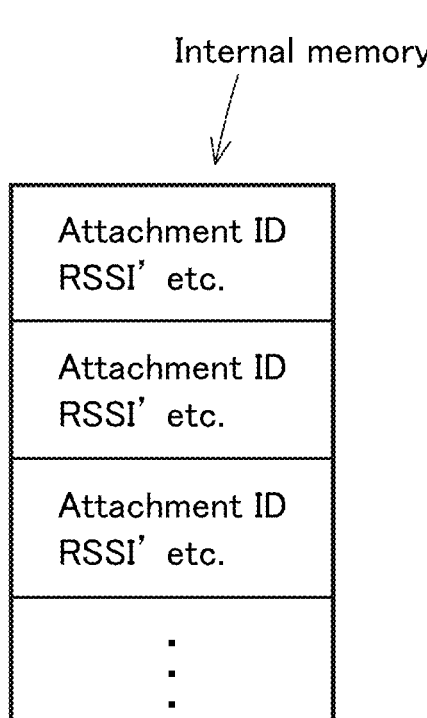
FIG. 7 is a diagram showing an example of information stored in an internal memory of a controller according to the first example embodiment of the present invention.

FIG. 7 shows information stored in the memory 21a of the controller 21. The controller 21 repeats the attachment information collecting process shown in FIG. 6, so that attachment IDs and their corresponding RSSI's are collected in the memory 21a as shown in FIG. 7.

Specifically, the controller 21 selects one of the advertisement signal(s) Q1 that is received by the beacon scanner 23 from the beacon transmitter 33 on the attachment 30 which is located close to the quick hitch 16 (working vehicle 1) to some extent and which has vibrated when attached to the quick hitch 16. The attachment ID included in the selected advertisement signal Q1 and the RSSI' of that advertisement signal Q1 are stored (collected) in the memory 21a of the controller 21 for the period of time T4. For another example, the controller 21 may cause the storing unit 22 to store the attachment ID and the RSSI' of the advertisement signal Q1 for the period of time T4.

When an attachment 30 located on the ground or the like is to be attached to the working vehicle 1, the operator of the working vehicle 1 operates the traveling device 5 and/or the working device 4 using the operation member(s) 6 and/or 7 to allow the front plates 50f of the brackets 50 of the quick hitch 16 to engage with the base plate 71 of the attachment 30, thus holding the attachment 30 with the brackets 50 (see FIG. 26A). In so doing, in some cases, the operator allows the front plates 50f to engage with the base plate 71 and then allow the booms 11 and/or the quick hitch 16 to swing upward by a predetermined angle using the work operation member 7 to raise the attachment 30 with the working device 4 to some extent to check whether the attachment 30 is held by the brackets 50.

Then, if the operator operates the attaching switch 26 for the first predetermined period of time T1 or more, the controller 21 causes the latch cylinder 52 to extend. With this, the latch levers 57 pivot downward, so that the latch pins 54 are inserted into the through-holes 71h of the base plate 71 of the attachment 30 to allow the attachment 30 to be latched by the latching mechanisms 51 (see FIG. 26B).

That is, the attachment 30 is brought into a state in which it is attached to the quick hitch 16 and the working vehicle 1.

During the steps of attaching the attachment 30 described above, the attachment 30 vibrates, for example, when the front plates 50f of the brackets 50 are brought into engagement with the base plate 71 of the attachment 30, when the attachment 30 is raised by the working device 4, and/or when the attachment 30 is latched by the latching mechanisms 51. The advertisement signal Q1 transmitted by the beacon transmitter 33 includes vibration information relating to the vibration state of the attachment 30 that has been detected by the vibration sensor 34 at any of the above-listed points in time.

Figure 8:
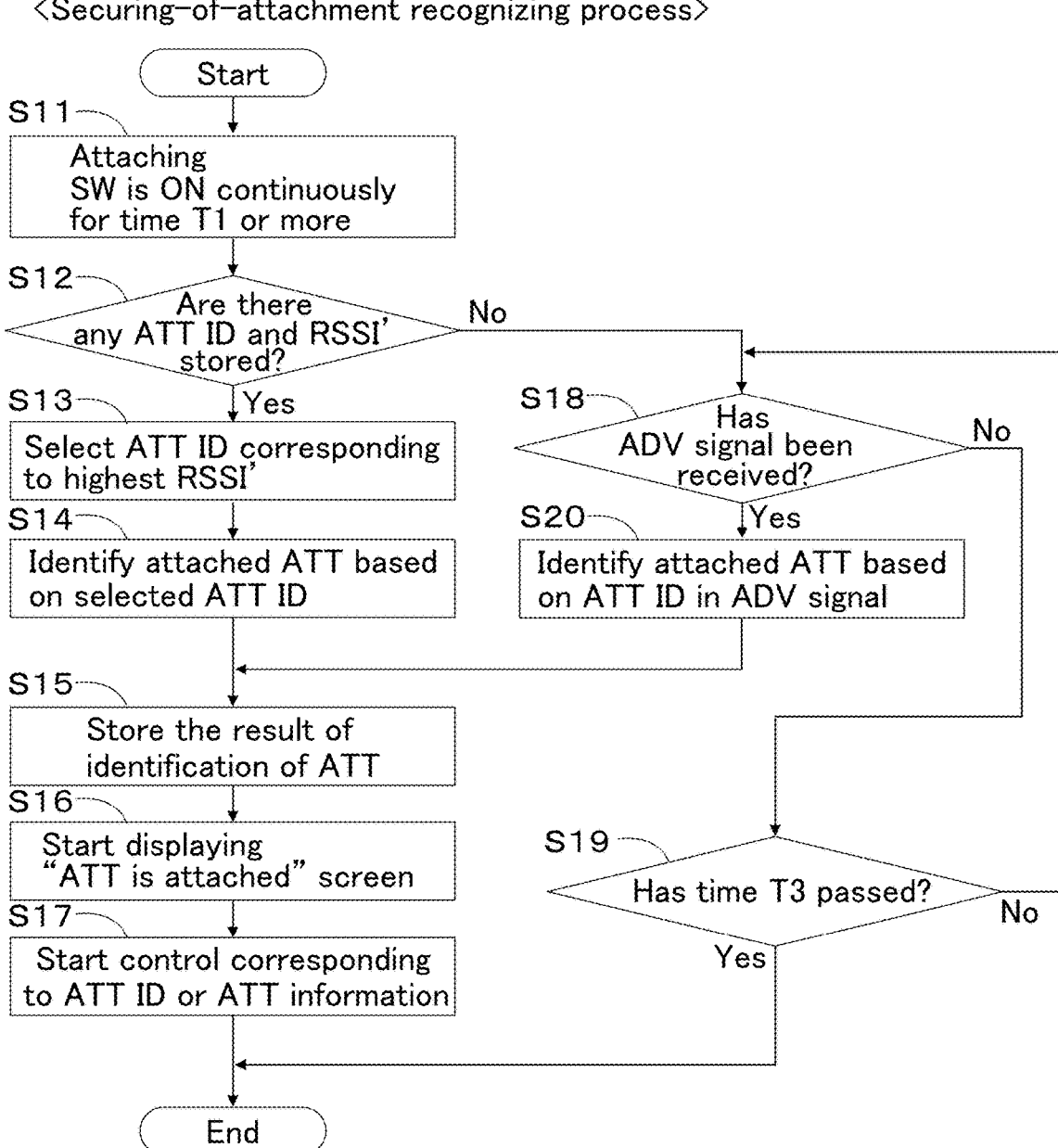
FIG. 8 is a flowchart showing an example of a securing-of-attachment recognizing process according to the first example embodiment of the present invention.

FIG. 8 is a flowchart showing an example of the securing-of-attachment recognizing process. If the attaching switch 26 is operated continuously (continues to be in ON state) for a first predetermined period of time T1 or more (S11 in FIG. 8) as described earlier, the controller 21 determines that the attachment 30 is attached to (secured to) the quick hitch 16. Next, the controller 21 determines whether or not any attachment IDs are stored in the memory 21a.

If the memory 21a stores one or more attachment IDs and corresponding one or more RSSI's therein (YES in S12), the controller 21 reads the one or more RSSI's and the one or more attachment IDs stored in the memory 21a, and selects one of the one or more attachment IDs that corresponds to the highest one of the RSSI's (S13). Next, the controller 21 identifies (recognizes) the attachment 30 attached to the quick hitch 16 based on the selected attachment ID (S14).

The one of the one or more advertisement signals Q1 received by the beacon scanner 23 that has the highest RSSI' is a signal transmitted from the beacon transmitter 33 located closest to the beacon scanner 23. Therefore, the controller 21 regards, as the ID of the attachment 30 attached to the quick hitch 16, the attachment ID included in an advertisement signal Q1 having the highest RSSI' of advertisement signals Q1 received by the beacon scanner 23 during the period of time T4 which ended when the attachment 30 was attached to the quick hitch 16, and selects that attachment ID. Next, the controller 21 identifies the type, other specifications, and/or the like of the attachment 30 attached to the quick hitch 16 based on the selected attachment ID.

The attachment ID corresponding to the highest RSSI' as described above is a predetermined condition based on which one of attachment ID(s) collected in the memory 21a is to be selected. Note that the RSSI's stored in the memory 21a may include one or more highest RSSI's. If a plurality of the highest RSSI's are stored in the memory 21a, such RSSI's have the same value and correspond to the same attachment ID. Therefore, the controller 21 may select one of the same attachment IDs (for example, the attachment ID corresponding to the latest receipt time) and identify the attachment 30 attached to the quick hitch 16 based on the selected attachment ID.

Next, the controller 21 causes the storing unit 22 to store the result of identification of the attachment 30 (S15). It is noted here that the controller 21 causes the storing unit 22 to store information indicating that the identified attachment 30 is attached to the quick hitch 16, i.e., to the working vehicle 1, and the attachment ID of the attached attachment 30.

The controller 21 starts a display process (predetermined process) in which the controller 21 causes the user interface 25 to display (output) an "attachment is attached" screen G1 which indicates that the attachment 30 corresponding to the selected attachment ID is attached and which displays attachment information relating to the attached attachment 30 (S16).

Figure 9:
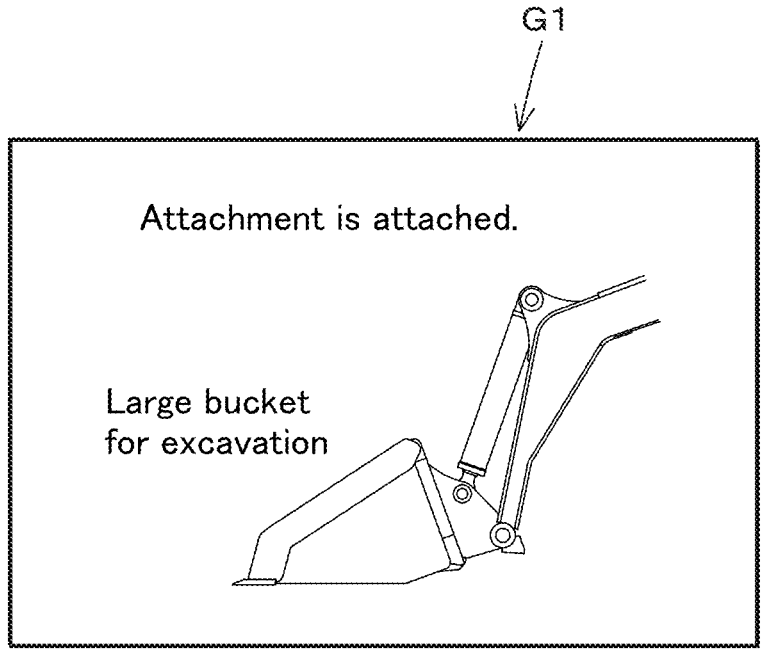
FIG. 9 illustrates an example of an "attachment is attached" screen according to the first example embodiment of the present invention.

FIG. 9 illustrates an example of the "attachment is attached" screen G1. The "attachment is attached" screen G1 displays a message indicating that the attachment 30 is attached, the attachment information relating to the attached attachment 30, and an icon of the attachment 30. In the example in FIG. 9, the attachment information "Large bucket" "for excavation" is displayed. Additionally or alternatively, other attachment information such as the attachment ID, size, and/or manufacturer of the attachment 30 may be displayed. The display data for the "attachment is attached" screen G1 and the attachment information are prestored in the storing unit 22.

For another example, the controller 21 may cause the communicator 24 (FIG. 1) to transmit, to the portable device 70, the display data for the "attachment is attached" screen G1 and the attachment information of the attachment 30 which has been determined as being attached so that the "attachment is attached" screen G1 is displayed on a display of the portable device 70.

The controller 21 starts predetermined control (predetermined process) according to the attachment ID selected in step S13 (S17). In so doing, the controller 21 reads control data corresponding to the selected attachment ID form the storing unit 22 and starts control corresponding to the attachment 30 attached to the quick hitch 16 based on the control data.

Specifically, in the case where the attachment 30 attached to the quick hitch 16 is an attachment 30b including a hydraulic actuator such as a skid cutter, the controller 21 starts causing the control valve 40d to control the output of hydraulic fluid from the hydraulic fluid outlet port 18a to the attachment 30b, based on the control data read from the storing unit 22. With this, draining of return fluid to be introduced from the attachment 30b into the hydraulic fluid inlet port 18b is also started. The controller 21 may, for example, cause the "attachment is attached" screen G1 to display a message indicating that the control of the output of hydraulic fluid to the attachment 30b has been started.

Note that, in the case where the attachment 30 attached to the quick hitch 16 is an attachment 30 including no hydraulic actuators such as a bucket 30a, the controller 21 does not cause the control valve 40d to output hydraulic fluid from the hydraulic fluid outlet port 18a to the attachment 30 based on the control data read from the storing unit 22. The controller 21 may start control such as adjusting and/or limiting the travel speed and/or speed stage of the working vehicle 1 and/or the height of the raised/lowered booms 11 according to the selected attachment ID in step S17.

On the contrary, if the memory 21a stores no attachment IDs or RSSI's (NO in S12), the controller 21 determines whether or not the beacon scanner 23 has received any advertisement signals Q1 from beacon transmitter(s) 33. For example, assume that the beacon scanner 23 receives an advertisement signal Q1 within a third predetermined period of time T3 (NO in S19) from when the attaching switch 26 has been operated continuously for the first predetermined period of time T1 or more (S11) (YES in S18). In such a case, the controller 21 identifies the attachment 30 attached to the quick hitch 16 based on the attachment ID included in this advertisement signal Q1 (S20). Next, the controller 21 causes the storing unit 22 to store the result of identification of the attachment 30 as described earlier (S15), and starts a predetermined process according to the attachment ID included in the received advertisement signal Q1 (S16, S17).

For another example, in the case where the beacon scanner 23 receives a plurality of advertisement signals Q1 within the third predetermined period of time T3 (YES in S18), the controller 21 may correct the RSSIs of the advertisement signals Q1 and determine at least one of whether the advertisement signals Q1 have an RSSI' higher than a predetermined value X or whether the advertisement signals Q1 include vibration information indicating that the corresponding attachment 30 is vibrating. The controller 21 may, if the RSSI' of any of the advertisement signals Q1 is higher than a predetermined value X and/or any of the advertisement signals Q1 includes vibration information indicating that the attachment 30 is vibrating, identify the attachment 30 attached to the quick hitch 16 based on the attachment ID included in that advertisement signal Q1 (S20). The controller 21 may cause the storing unit 22 to store the result of identification of the attachment 30 (S15) and start a predetermined process according to the attachment ID included in the advertisement signal Q1 (S16, S17).

In the attachment information collecting process shown in FIG. 6, the controller 21 selects one of the advertisement signals Q1 received by the beacon scanner 23 that has an RSSI' higher than first predetermined value X and that includes vibration information indicating that the attachment 30 is vibrating (YES in S5, YES in S7), and causes the memory 21a to store (collect) only the attachment(s) ID included in such advertisement signal(s) Q1 (S8). Note, however, that the controller 21 may, in the case where it is determined that the RSSI' of the advertisement signal Q1 received by the beacon scanner 23 is higher than the first predetermined value X, cause the memory 21a to store the attachment ID(s) included in such advertisement signal(s) Q1 irrespective of vibration information.

Figure 10:
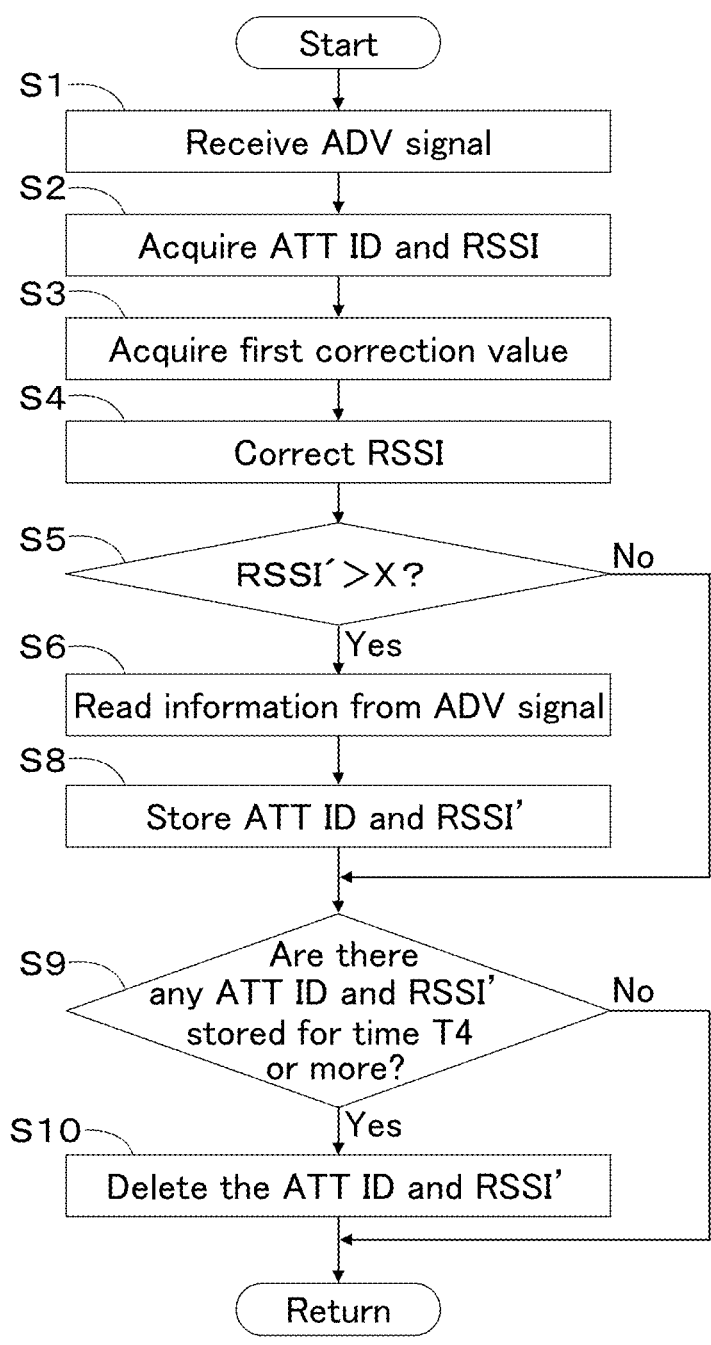
FIG. 10 is a flowchart showing another example of the attachment information collecting process according to the first example embodiment of the present invention.

Specifically, as shown in FIG. 10, the controller 21 may select one or more of the advertisement signal(s) Q1 received by the beacon scanner 23 that have an RSSI' higher than the first predetermined value X (YES in S5) and cause the memory 21a to store only the attachment ID(s) included in the one or more advertisement signals Q1 (S6, S8).

Figure 11:
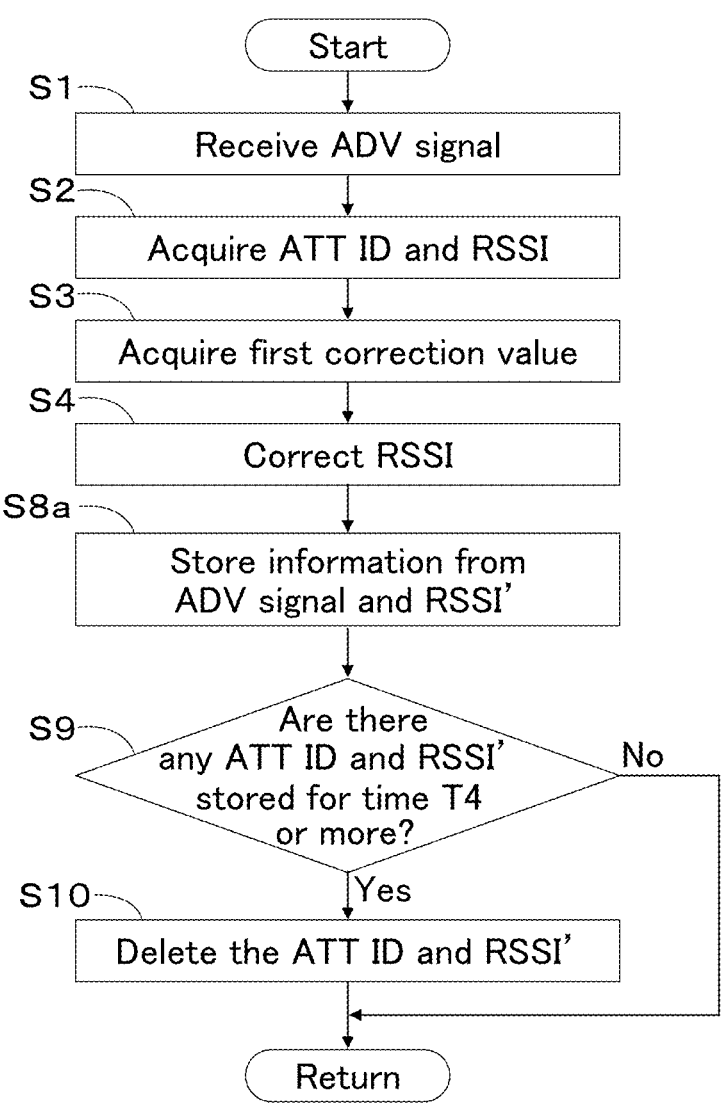
FIG. 11 is a flowchart showing a further example of the attachment information collecting process according to the first example embodiment of the present invention.

For another example, the controller 21 may cause the memory 21a to store the attachment ID(s) included in all the advertisement signal(s) Q1 received by the beacon scanner 23 from the beacon transmitter(s) 33. Specifically, for example, as shown in FIG. 11, after the controller 21 receives advertisement signal(s) Q1 (S1) and corrects the RSSI(s) of the advertisement signal(s) Q1 acquired in step S3 (S4), the controller 21 causes the memory 21a to store information such as the attachment ID and vibration information included in each advertisement signal Q1 and the RSSI' of the advertisement signal Q1 such that the information and the RSSI' are associated with each other (S8a).

Figure 15:
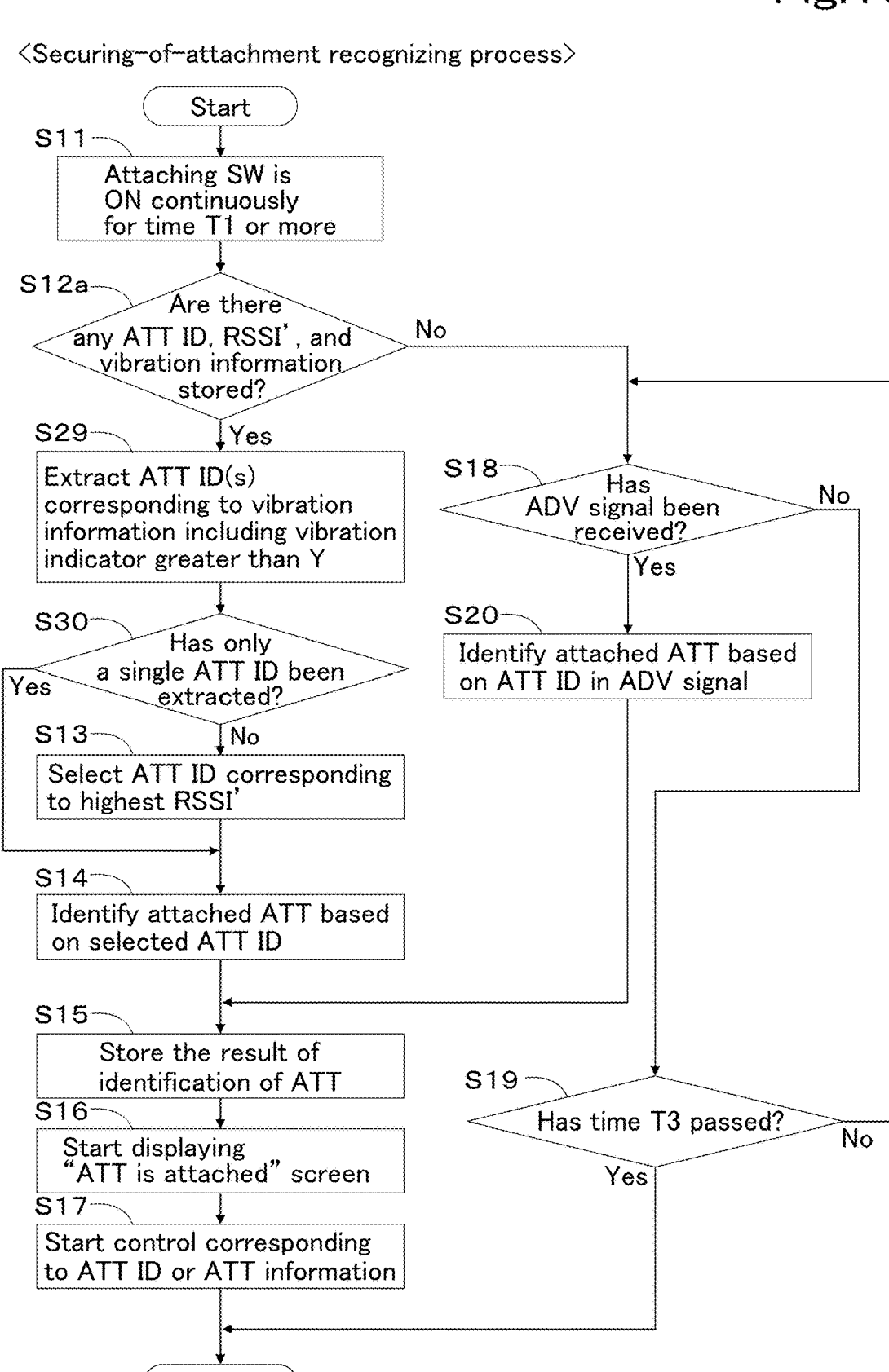
FIG. 15 is a flowchart showing still a further example of the securing-of-attachment recognizing process according to the first example embodiment of the present invention.

With this, as shown in FIG. 12, the attachment IDs and pieces of vibration information included in all the advertisement signals Q1 received by the beacon scanner 23 are collected in the memory 21a. In such a case, the controller 21 may perform the securing-of-attachment recognizing process as shown in FIGS. 13 to 15, for example.

Figure 13:
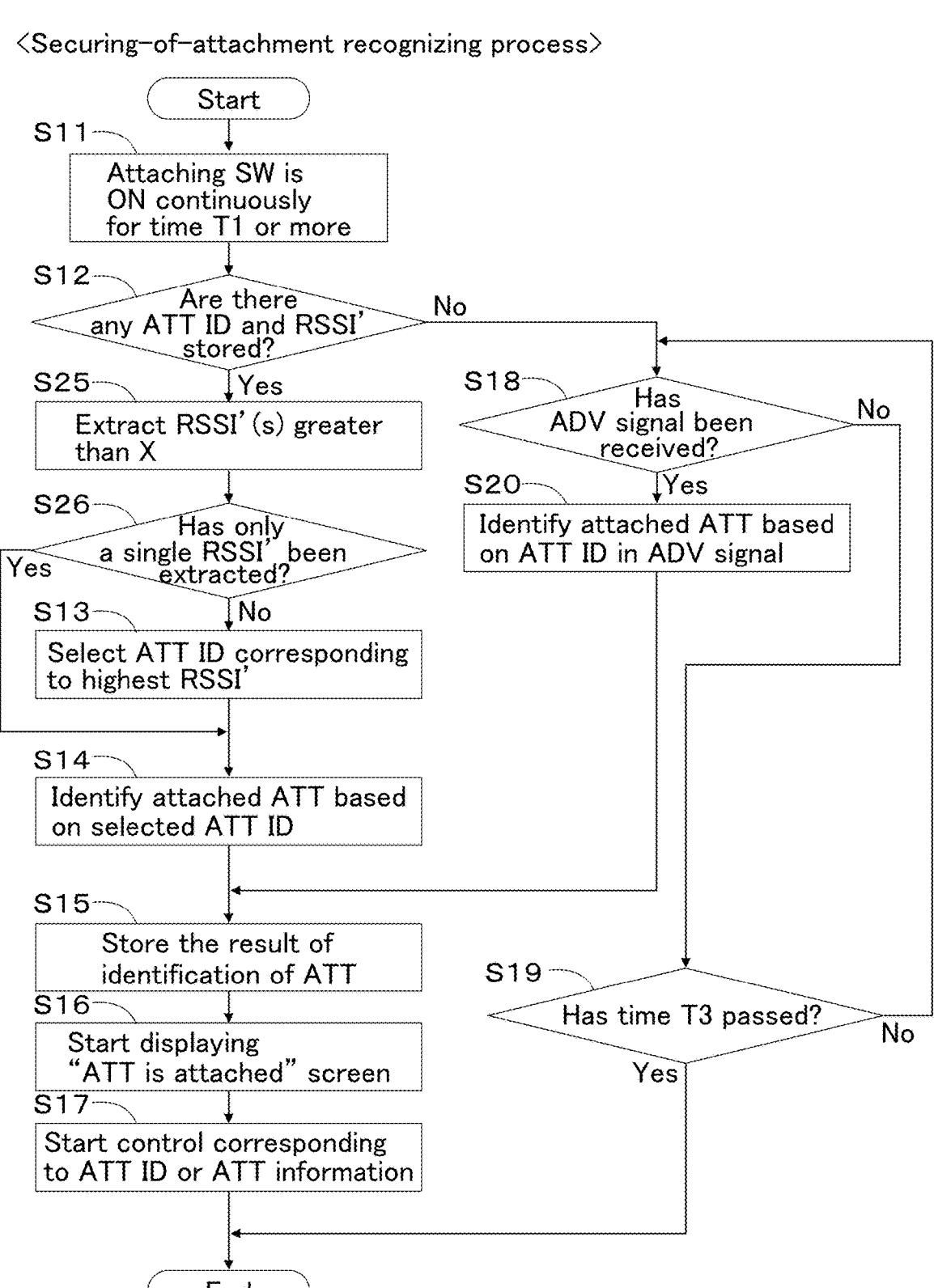
FIG. 13 is a flowchart showing another example of the securing-of-attachment recognizing process according to the first example embodiment of the present invention.

In FIG. 13, in the case where the memory 21a stores attachment ID(s) and RSSI' (s) (YES in S12), the controller 21 extracts one or more of the RSSI' (s) stored in the memory 21a that are higher than the first predetermined value X (S25). If a single RSSI' is extracted (YES in S26), the controller 21 selects the attachment ID corresponding to that RSSI' from the memory 21a and identifies the attachment 30 attached to the quick hitch 16 based on the attachment ID (S14).

In contrast, if two or more RSSI's are extracted (NO in S26), the controller 21 selects the attachment ID corresponding to the highest one of the extracted RSSI's (S13). The controller 21 then identifies the attachment 30 attached to the quick hitch 16 based on the selected attachment ID (S14).

In FIG. 14, in the case where the memory 21*a* stores attachment ID(s), RSSI' (s), and piece(s) of vibration information (YES in S12*a*), the controller 21 extracts one or more of the attachment ID(s) that correspond to RSSI' (s) higher than the first predetermined value X and correspond to piece(s) of vibration information indicating that the corresponding attachment 30 is vibrating (S27). If a single attachment ID is extracted (YES in S28), the controller 21 identifies the attachment 30 attached to the quick hitch 16 based on that attachment ID (S14). That is, the controller 21 selects the extracted attachment ID as the attachment ID of the attachment 30 attached to the quick hitch 16.

On the contrary, if two or more attachment IDs are extracted (NO in S28), the controller 21 selects the attachment ID that corresponds to the highest one of the RSSI's higher than the first predetermined value X (S13). The controller 21 then identifies the attachment 30 attached to the quick hitch 16 based on the selected attachment ID (S14).

In FIG. 15, in the case where the memory 21*a* stores attachment ID(s), RSSI' (s), and piece(s) of vibration information (YES in S12*a*), the controller 21 extracts one or more of the attachment ID(s) that correspond to vibration information including a vibration indicator greater than the second predetermined value Y (S29). If a single attachment ID is extracted (YES in S30), the controller 21 identifies the attachment 30 attached to the quick hitch 16 based on the attachment ID (S14). That is, the controller 21 selects the extracted attachment ID as the attachment ID of the attachment 30 attached to the quick hitch 16.

On the contrary, if two or more attachment IDs are extracted (NO in S30), the controller 21 selects the attachment ID that corresponds to the highest RSSI' of the RSSI's higher than the first predetermined value X (S13). The controller 21 identifies the attachment 30 attached to the quick hitch 16 based on the selected attachment ID (S14).

In the securing-of-attachment recognizing process in FIGS. 13 to 15, after the controller 21 performs step S14, the controller 21 causes the result of identification of the attachment 30 to be stored as described earlier (S15) and starts a predetermined process corresponding to the selected attachment ID (S16, S17). In the case where the memory 21*a* stores no attachment IDs (NO in S12), the controller 21 performs steps S18 to S20 as described earlier.

In example embodiments as shown in FIG. 8 and the like, the controller 21 selects the attachment ID that corresponds to the highest RSSI' from pieces of information (such as attachment IDs and RSSI's) collected in the memory 21*a*. However, additionally or alternatively, for example, the controller 21 may select attachment ID(s) satisfying a predetermined condition relating to RSSI' from pieces of information collected in the memory 21*a*, such as the attachment ID that corresponds to the RSSI' closest to a predetermined strength threshold Th higher than the predetermined value X or the attachment ID that corresponds to the RSSI' which has been determined as being equal to or higher than a predetermined strength threshold Th the predetermined number of times.

In the above-described example embodiment, the controller 21 uses corrected RSSIs (RSSI's) in the attachment information collecting process and the securing-of-attachment recognizing process, for example. Note, however, that the controller 21 may perform a process using RSSI's after starting the predetermined process. For example, the controller 21 may, in order to check the accuracy of the selection of the attachment ID based on the RSSI's in step S13, perform a confirming process (selection-of-attachment confirming process) based on the RSSI's.

Figure 16:
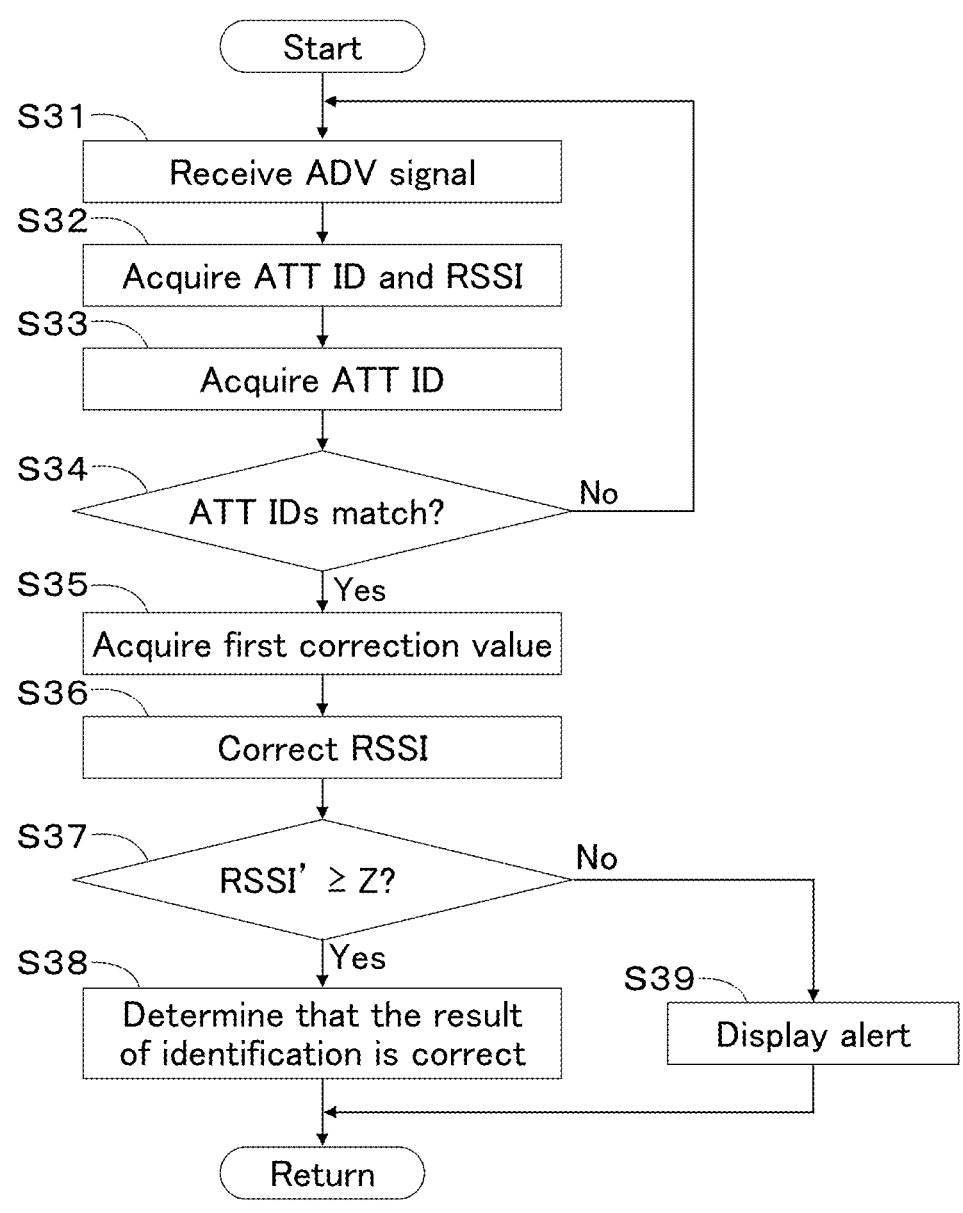
FIG. 16 is a flowchart showing an example of a selection-of-attachment confirming process according to the first example embodiment of the present invention.

FIG. 16 is a flowchart showing an example of the selection-of-attachment confirming process. After starting the predetermined process (S16, S17), upon receipt of an advertisement signal Q1 by the beacon scanner 23 from a beacon transmitter 33 (S31), the controller 21 acquires the attachment ID and RSSI of the advertisement signal Q1 from the beacon scanner 23 (S32). The controller 21 refers to the results of identification of the attachment(s) 30 stored in the storing unit 22 and acquires the attachment ID of the attached attachment 30 (S33).

If the attachment ID of the attached attachment 30 matches the attachment ID acquired from the beacon scanner 23 (YES in S34), the controller 21 refers to the first correction table stored in the storing unit 22 to acquire the first correction value corresponding to the acquired attachment ID (S35). The controller 21 corrects the RSSI using the acquired first correction value (S36).

If the RSSI' is equal to or higher than a predetermined value (third predetermined value) Z (YES in S37), the controller 21 determines that the result of identification of the attachment 30 is correct (S38). Note that the third predetermined value Z is greater than the first predetermined value X.

On the contrary, if the RSSI' is lower than the third predetermined value Z (NO in S37), the controller 21 causes a display of the user interface 25 or the portable device 70 etc. to display information indicating that the attachment 30 corresponding to the selected attachment ID may not be attached to the quick hitch 16 (working vehicle 1) to display an alert (S39).

Furthermore, in a case that an attachment 30 is attached to the quick hitch 16 (in a case that the predetermined process (S16, S17) has been started), the controller 21 may correct the RSSI of the advertisement signal Q1 transmitted from the beacon transmitter 33 on the attachment 30 based on the attachment ID and then further correct the corrected RSSI based on the relative position changed by the position changer C. For example, in the selection-of-attachment confirming process, the controller 21 further corrects the RSSI'.

As illustrated in FIG. 1, the controller 21 has a detection sensor 80 connected thereto. The detection sensor 80 detects an operating condition (operating status) of the position changer C, and the controller 21 calculates the relative position of the quick hitch 16 to the machine body 2 based on the detection result from the detection sensor 80. The detection sensor 80 includes a potentiometer to directly detect the swinging movement of the booms 11 and the attachment 30, a stroke sensor to detect the degree of extension and retraction of the boom cylinders 14 and the front cylinders 15, and/or the like. The controller 21 calculates the relative position of the quick hitch 16 to the machine body 2 based on the detection result (detection signal) outputted from the detection sensor 80 and on a function stored in the storing unit 22. The relative position of the quick hitch 16 to the machine body 2 calculated by the controller 21 is, for example, a positional relationship between the quick hitch 16 and the machine body 2 in an up-and-down direction.

The controller 21 corrects the RSSI' based on the calculated relative position. For example, the controller 21 corrects the RSSI' such that the RSSI' decreases as the relative positions of the quick hitch 16 and the machine body 2 approach each other. On the contrary, the controller 21 corrects the RSSI' such that the RSSI' increases as the relative positions of the quick hitch 16 and the machine body 2 go away from each other.

In the present example embodiment, as the quick hitch 16 moves upward relative to the machine body 2, the relative positions of the quick hitch 16 and the machine body 2 approach each other, whereas, as the quick hitch 16 moves downward relative to the machine body 2, the relative positions of the quick hitch 16 and the machine body 2 go away from each other. Therefore, the controller 21 corrects the RSSI' such that the RSSI' decreases as the quick hitch 16 moves upward relative to the machine body 2. On the contrary, the controller 21 corrects the RSSI' such that the RSSI' increases as the quick hitch 16 moves downward relative to the machine body 2. The controller 21 corrects the RSSI' based on a correction function in which the relative position of the quick hitch 16 (the position of the quick hitch 16 relative to the machine body 2 in the up-and-down direction) is a variable.

The correction function is stored in a predetermined storage area of the storing unit 22. Therefore, in a case that the attachment 30 is attached to the quick hitch 16 (in a case that the predetermined process (S16, S17) has been started), the controller 21 acquires the correction function from the storing unit 22 and further corrects the RSSI'.

Note that, in the above-described example, the controller 21 corrects the RSSI' based on the relative position and the correction function, for example. Note, however, that the method of correcting RSSI' based on the relative position is not limited to using the correction function. RSSI' may be corrected using a predetermined correction coefficient.

Figure 17:
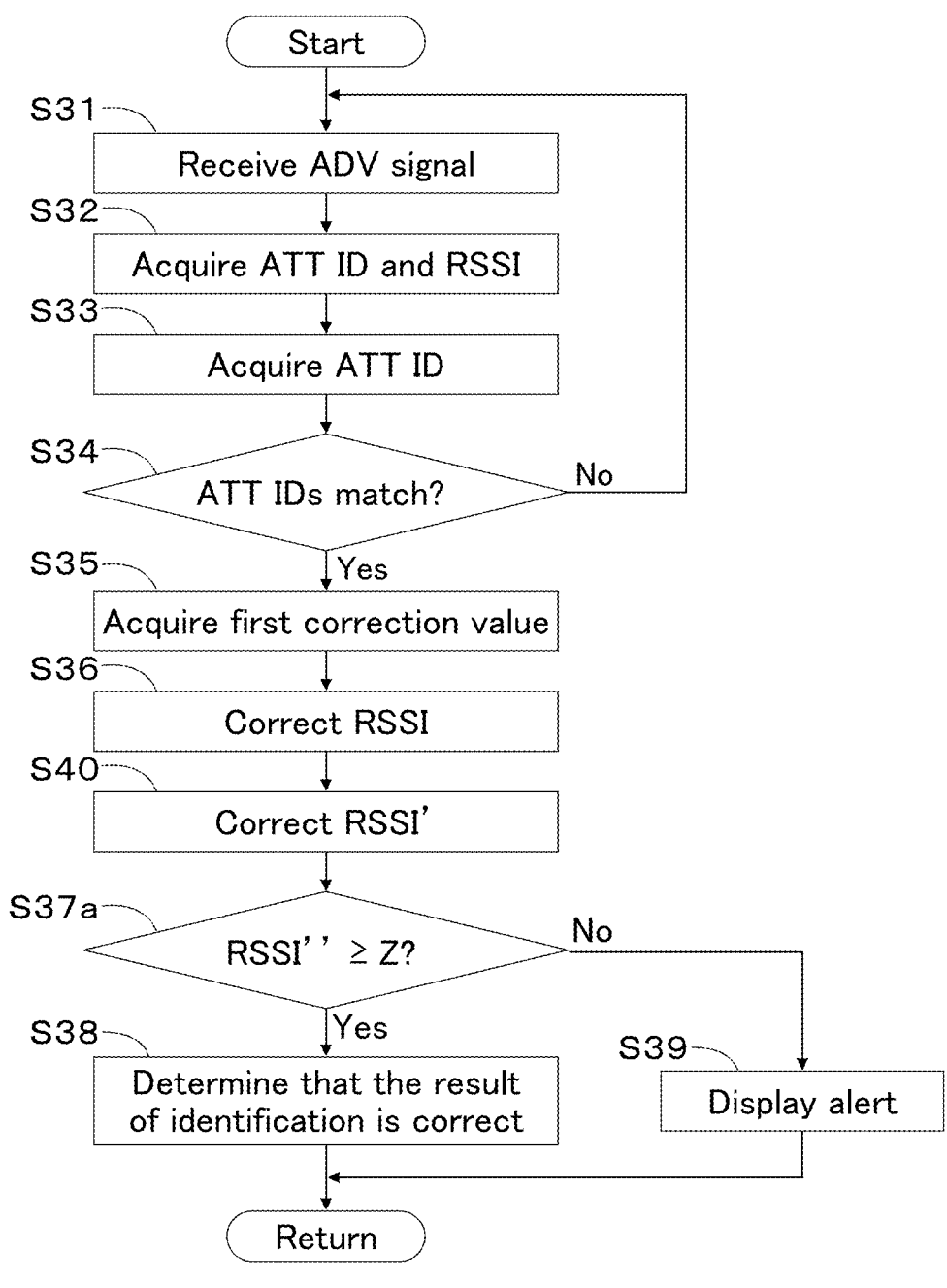
FIG. 17 is a flowchart showing another example of the selection-of-attachment confirming process according to the first example embodiment of the present invention.

FIG. 17 is a flowchart showing another example of the selection-of-attachment confirming process. In FIG. 17, after correcting an RSSI using a first correction value to obtain an RSSI' (S36), the controller 21 further corrects the RSSI' based on the correction function stored in the storing unit 22 to obtain an RSSI" (S40). If the RSSI" is equal to or higher than a predetermined value (third predetermined value) Z (YES in S37a), the controller 21 determines that the result of identification of the attachment 30 is correct (S38). On the contrary, if the RSSI" is less than the third predetermined value Z (NO in S37a), the controller 21 causes the display of the user interface 25 or the portable device 70 etc. to display an alert (S39).

A working vehicle 1 according to one or more example embodiments described so far includes a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the linkage 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to correct the one or more received signal strengths based on the one or more pieces of identification information, and select the piece of identification information of the attachment 30 attached to the linkage 16 based on the corrected one or more received signal strengths.

An attachment usage system 100 according to one or more example embodiments described so far includes a linkage 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, and a receiver 23 in or on the working vehicle 1 to receive the one or more wireless signals Q1 transmitted from the one or more transmitters 33, and a controller 21 configured or programmed to select a piece of identification information of the attachment 30 attached to the linkage 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the controller 21 is configured or programmed to correct the one or more received signal strengths based on the one or more pieces of identification information, and select the piece of identification information of the attachment 30 attached to the linkage 16 based on the corrected one or more received signal strengths.

With the working vehicle 1 and the attachment usage system 100, it is possible to appropriately correct the received signal strength for each identification information of the attachment 30. This achieves the following. If the transmitter 33 is attached in a manner that differs from one attachment 30 to another or if the signal strength (output strength) of the wireless signal Q1 differs from one transmitter 33 to another, the received signal strength may vary even if such attachments 30 are at the same distance from the receiver 23. By correcting the received signal strength based on identification information, it is possible to prevent or reduce variations in received signal strengths of the attachments 30 that would be caused by the above reason.

The controller 21 may be configured or programmed to correct the one or more received signal strengths using one or more correction values corresponding to the one or more pieces of identification information.

With this, since the correction value(s) are allocated to the respective piece(s) of identification information, it is possible to easily and reliably correct the received signal strength.

The one or more correction values may be defined according to the one or more attachments 30 corresponding to the one or more pieces of identification information.

This achieves the following. Depending on the structure of the attachment 30, the shape of the attachment 30, and content of work done by the attachment 30, the position to which the transmitter 33 is attached may be limited and the received signal strength of the wireless signal Q1 may differ between attachments 30 located at the same distance from the receiver 23. In this regard, since the correction value(s) are defined for the respective attachment(s) 30, it is possible to appropriately prevent or reduce variations in received signal strengths of the attachments 30. Even in cases where transmitters 33 of different types are attached to respective attachments 30 and the output strengths of the wireless signals Q1 outputted by the transmitters 33 are different, since the correction values are defined for the respective attachments 30, it is possible to appropriately prevent or reduce variations in received signal strengths of the attachments 30 that would result from the types of the transmitters 33.

The one or more correction values may be defined according to one or more types of the one or more attachments 30 corresponding to the one or more pieces of identification information.

This achieves the following. Depending on the type of attachment 30, the position to which the transmitter 33 is attached may be limited depending on the content of work, and the received signal strength of the wireless signal Q1 may differ between attachments 30 located at the same distance from the receiver 23. In this regard, since the correction values are defined for the respective types of attachments 30, the controller 21 is capable of appropriately correcting the received signal strength based on the corresponding type. This makes it possible to prevent or reduce variations in received signal strengths of the respective types of attachments 30.

The working vehicle 1 may further include a storing unit (a memory and/or a storage) 22 to store a table in which the one or more correction values and the one or more pieces of identification information are associated with each other. The controller 21 may be configured or programmed to acquire the one or more correction values based on the one or more pieces of identification information included in the one or more wireless signals Q1 received by the receiver 23 and on the table stored in the memory and/or the storage 22.

With this, the controller 21 is capable of easily acquiring a correction value corresponding to the identification information from the table. This makes it possible to reduce the load of the process of correcting received signal strength on the controller 21, and possible to quickly and appropriately select the identification information of the attachment 30.

The linkage 16 may include a hitch to attach and detach the attachment 30 thereto and therefrom. The controller 21 may be configured or programmed to cause a memory 21a to store, for a period of time, the one or more pieces of identification information included in the one or more wireless signals Q1 received by the receiver 23. The controller 21 may be configured or programmed to, when the attachment 30 is attached to the hitch, perform the predetermined process based on one of the one or more pieces of identification information that (i) is stored in the memory 21a and (ii) is included in one of the one or more wireless signals Q1 that is highest in corrected received signal strength.

With this, even if a plurality of attachments 30 are present in the vicinity of the working vehicle 1 and at least one of the attachments 30 is in a stationary state in which, for example, it is allowed to stand without making any movement or action or even if at least one of the attachments 30 is in a dynamic state in which, for example, it is attached to another working vehicle 1 or the like and moving, the controller 21 can reliably and easily select from the memory 21a the piece of identification information included in the wireless signal Q1 transmitted from the transmitter 33 of the attachment 30 attached to the hitch 16 located closest to the receiver 23 and appropriately and immediately start the predetermined process according to the selected piece of identification information.

The working vehicle 1 may further include a machine body 2 including the receiver 23 therein or thereon, and a position changer C including the linkage 16 to change a relative position of the linkage 16 to the machine body 2. The controller 21 may be configured or programmed to, in a case that the attachment 30 is attached to the linkage 16, further correct, based on the relative position, the corrected received signal strength of the wireless signal Q1 transmitted from the transmitter 33 in or on the attachment 30.

This achieves the following. There may be cases in which the received signal strength of a wireless signal Q1 differs between when the attachment 30 is linked to the linkage 16 and when the relative position of the linkage 16 (attachment 30) to the machine body 2 is changed by the position changer C after the attachment 30 is linked to the linkage 16, because of the change in the relative position. In this regard, since the controller 21 further corrects the corrected received signal strength based on the relative position, it is possible to more appropriately compare the received signal strength at a point in time at which the attachment 30 is linked to the linkage 16 and the received signal strength after the relative position is changed by the position changer C after the attachment 30 is linked to the linkage 16.

Second Example Embodiment

In the first example embodiment described above, RSSI is corrected based on an advertisement signal Q1, for example. The first correction value for correction of the RSSI may be transmitted from a beacon transmitter 33. In such a case, the beacon transmitter 33 transmits an advertisement signal Q1 that includes a first correction value for correction of RSSI. That is, in the second example embodiment, the first correction value is included in other information of the advertisement signal Q1. The controller 21 corrects the RSSI(s) using the first correction value(s) included in the advertisement signal(s) Q1, and selects the attachment ID of the attachment 30 attached to the quick hitch 16 based on the RSSI' (s). Note that how specifically first correction values are defined etc. are the same as those described earlier in the first example embodiment, and details thereof are not repeated here.

Figure 18:
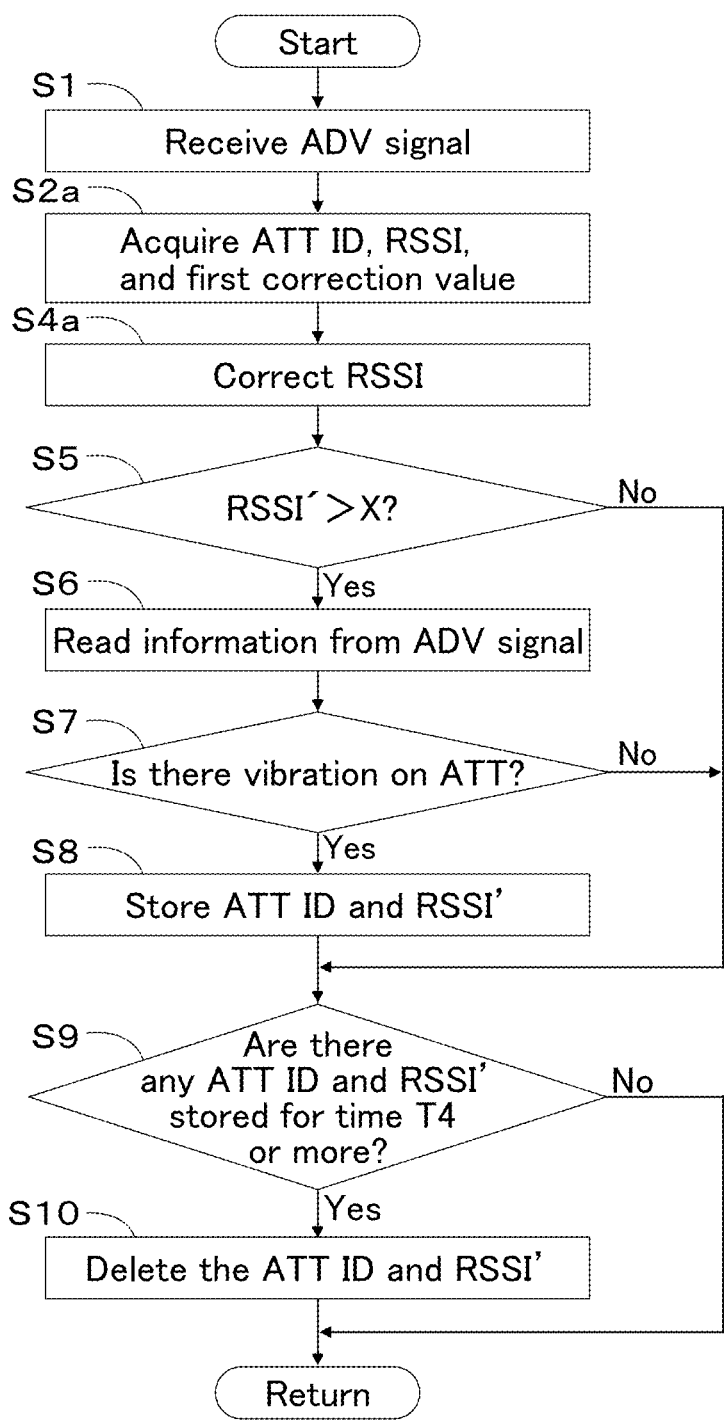
FIG. 18 is a flowchart showing an example of an attachment information collecting process according to a second example embodiment of the present invention.

FIG. 18 is a flowchart showing an example of an attachment information collecting process according to the second example embodiment. In the second example embodiment, upon receipt of an advertisement signal Q1 by the beacon scanner 23 from a beacon transmitter 33 (S1), the controller 21 acquires the attachment ID, RSSI, and first correction value of the advertisement signal Q1 from the beacon scanner 23 (S2a). Upon acquisition of the attachment ID, RSSI, and first correction value, the controller 21 corrects the RSSI using the acquired first correction value (S4a). The controller 21, after performing step S4a, performs step S5 and subsequent steps.

A working vehicle 1 according to the second example embodiment described above includes a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select a piece of identification information of the attachment 30 attached to the linkage 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the one or more transmitters 33 are operable to transmit the one or more wireless signals Q1 including one or more correction values to correct the one or more received signal strengths, and the controller 21 is configured or programmed to correct the one or more received signal strengths using the one or more correction values included in the one or more wireless signals Q1, and select the piece of identification information of the attachment 30 attached to the linkage 16 based on the corrected one or more received signal strengths.

An attachment usage system 100 according to the second example embodiment described above includes a linkage 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, and a receiver 23 in or on the working vehicle 1 to receive the one or more wireless signals Q1 transmitted from the one or more transmitters 33, and a controller 21 configured or programmed to select a piece of identification information of the attachment 30 attached to the linkage 16 based on the one or more pieces of identification information included in the one or more wireless signals Q1 received by the receiver 23 and on one or more received signal strengths of the one or more wireless signals Q1, and perform a predetermined process based on the selected piece of identification information, wherein the one or more transmitters 33 are operable to transmit the one or more wireless signals Q1 including one or more correction values to correct the one or more received signal strengths, and the controller 21 is configured or programmed to correct the one or more received signal strengths using the one or more correction values included in the one or more wireless signals Q1, and select the piece of identification information of the attachment 30 attached to the linkage 16 based on the corrected one or more received signal strengths.

With the working vehicle 1 and the attachment usage system 100, it is possible to appropriately correct the received signal strength for each identification information of the attachment 30. This achieves the following. If the transmitter 33 is attached in a manner that differs from one attachment 30 to another or if the output strength of the wireless signal Q1 differs from one transmitter 33 to another, the received signal strength may vary even if such attachments 30 are at the same distance from the receiver 23. By correcting the received signal strength based on a correction value included in the wireless signal Q1, it is possible to prevent or reduce variations in received signal strengths of the attachments 30 that would be caused as described above. Furthermore, since the correction value is included in the wireless signal Q1, it is possible to reduce the load of the process of correcting received signal strength(s) on the controller 21 and possible to quickly and appropriately select the identification information of the attachment 30.

Third Example Embodiment

In the first and second example embodiments described above, the controller 21 selects the attachment ID of the attachment 30 attached to the quick hitch 16 based on corrected RSSI(s) (RSSI' (s)) in the information collected in the memory 21a (such as attachment IDs, RSSI's). Note, however, that the controller 21 may select, as the attachment ID of the attachment 30 attached to the quick hitch 16, an attachment ID included in an advertisement signal Q1 that is received by the receiver 23 and that has an RSSI equal to or higher than a threshold Th (strength threshold). In such a case, the controller 21 may or may not cause the memory 21a to collect information such as attachment IDs and RSSIs. The third example embodiment is described based on an example in which the controller 21 skips the attachment information collecting process and performs the securing-of-attachment recognizing process.

The strength threshold Th is greater than the predetermined value X, as described earlier. In such a case, the controller 21 corrects the strength threshold(s) Th based on the attachment ID(s) to obtain strength threshold(s) Th', and selects, as the attachment ID of the attachment 30 attached to the quick hitch 16, the attachment ID included in the advertisement signal Q1 having an RSSI equal to or higher than the corresponding strength threshold Th'.

Specifically, in a case that at least one attachment 30 is present in the vicinity of the working vehicle 1, the beacon scanner 23 receives advertisement signal(s) Q1 from the beacon transmitter(s) 33 of the attachment(s) 30. The beacon scanner 23, upon each receipt of an advertisement signal Q1, measures the RSSI of the advertisement signal Q1.

The controller 21 reads an attachment ID and RSSI from the at least one advertisement signal Q1 received by the beacon scanner 23. The controller 21, upon acquisition of the attachment ID and RSSI, corrects the strength threshold Th based on the attachment ID. That is, the corrected strength threshold Th (strength threshold Th') is defined for each attachment ID.

Specifically, the controller 21 corrects the strength threshold Th using a correction value corresponding to the attachment ID. The correction value corresponds to the attachment ID, and is defined according to the attachment 30 corresponding to the attachment ID. Note that a correction value for correction of the strength threshold Th is hereinafter referred to as a second correction value for convenience of description.

FIG. 19 is a table showing an example of the relationship between attachment IDs and their corresponding second correction values. The controller 21 corrects a strength threshold Th by multiplying the strength threshold Th by a second correction value. In other words, the second correction value is a correction coefficient to correct the strength threshold Th. The second correction value is defined in the following manner, as with the case of the first correction value, for example. Beacon transmitters 33 attached to respective attachments 30 are located at the same distance from the beacon scanner 23, advertisement signals Q1 transmitted from the respective beacon transmitters 33 are received by the beacon scanner 23, and each second correction value is defined based on the actual magnitude of RSSI measured by the beacon scanner 23.

In so doing, a second correction value to increase the strength threshold Th is defined for the attachment ID of the attachment 30 having attached thereto a beacon transmitter 33 whose measured RSSI is higher than a predefined reference value. On the contrary, a second correction value to reduce the strength threshold Th is defined for the attachment ID of the attachment 30 having attached thereto a beacon transmitter 33 whose RSSI is lower than a predefined reference value. Thus, the second correction value is defined by dividing the RSSI by the reference value such that the ratio between the strength threshold Th' (corrected strength threshold) and the strength threshold Th (strength threshold not corrected) approaches the ratio between the RSSI and the reference value. That is, if the measured RSSI is the same or substantially the same as the reference value, the second correction value for the attachment ID of the attachment 30 having the beacon transmitter 33 attached thereto is "1".

Such attachment IDs of the attachments 30 and the second correction values are associated with each other and stored, on the form of a table (second correction table), in a predetermined storage area of the storing unit 22. Thus, the controller 21 acquires one or more second correction values based on one or more attachment IDs included in one or more advertisement signals Q1 received by the beacon scanner 23 and on the second correction table stored in the storing unit 22.

Note that, in the above-described example, the controller 21 performs a process of correcting the strength threshold Th using a second correction value upon each acquisition of the attachment ID of an attachment 30, but the strength threshold Th is substantially not corrected when the second correction value is "1". Therefore, when defining a second correction value, if the RSSI of an advertisement signal Q1 transmitted from a beacon transmitter 33 attached to an attachment 30 is the same or substantially same as the reference value, it is not necessary to define a second correction value for the attachment ID of the attachment 30. In so doing, upon acquiring the attachment ID, the controller 21 may skip the process to correct the strength threshold Th using a second correction value. In other words, the controller 21 need only correct the strength threshold Th only at least upon acquisition of at least one of specific attachment ID(s) (one or more attachment IDs), and does not need to correct the strength thresholds Th based on all the attachment IDs.

The second correction values in the second correction table stored in the storing unit 22 may be edited appropriately by the operator via the user interface 25 or the portable device 70 etc., and the operator may set a second correction value per attachment 30. In such a case, the operator may use the user interface 25 or the portable device 70 etc. to set a specific second correction value corresponding to the attachment ID of each attachment 30, and may select a level (level of strength threshold) so that the corresponding second correction value is set.

In the above-described example, the second correction value is defined according to the attachment 30. The second correction value need only be defined based on at least the content of work done by the attachment 30, the structure of the attachment 30, the shape of the attachment 30, and/or the like, and may be defined according to the type of the attachment 30 corresponding to the attachment ID. In the present example embodiment, since the beacon scanner 23 is attached to an upper portion of the cabin 3, there are cases in which the RSSI of the advertisement signal Q1 received by the beacon scanner 23 from the beacon transmitter 33 attached at a high position is higher than the RSSI of the advertisement signal Q1 received by the beacon scanner 23 from the beacon transmitter 33 attached at a low position. To address this, for example, the second correction value for a pallet fork which has a beacon transmitter 33 attached at a relatively high position is greater than the second correction value for a skid cutter which has a beacon transmitter 33 attached at a relatively low position.

In the above-described example, the controller 21 corrects a strength threshold Th by multiplying the strength threshold Th by a second correction value, for example. Note, however, that the method of correcting the strength threshold Th using a second correction value is not limited to multiplication. The controller 21 may divide the strength threshold Th by the second correction value, depending on how the second correction value is defined (in a case that the second correction value is defined by dividing the reference value by the strength threshold Th). In cases where the second correction value is defined based on the difference between the reference value and RSSI, the controller 21 may correct the strength threshold Th by adding or subtracting the second correction value to or from the strength threshold Th. The method of correction is not limited to those described above. The controller 21 may correct the strength threshold Th using a function instead of the second correction value. In such a case, the function includes a variable corresponding to the attachment 30 or the type of the attachment 30.

Also in other methods of correction, a second correction value or a function is defined such that the ratio between the strength threshold Th' (corrected strength threshold) and the strength threshold Th (strength threshold not corrected) approaches the ratio between the RSSI and the reference value, similarly to the example described above. Note that the second correction value or the function etc. may be defined using simulation results based on the position(s) of the beacon transmitter(s) 33 attached to the attachment(s) 30, the structure and/or shape of the attachment(s) 30, and/or the like.

After correcting the strength threshold Th, the controller 21 selects the attachment ID that has an RSSI equal to or higher than the strength threshold Th' (corrected strength threshold). Next, the controller 21 identifies the specifications etc. of the attachment 30 attached to the quick hitch 16 based on the selected attachment ID, and starts a predetermined process based on the attachment ID.

Note that that the controller 21 may be configured or programmed to, after correcting the strength threshold Th, cause the internal memory (memory) 21*a* to store the attachment ID that has an RSSI equal to or higher than the strength threshold Th' (corrected strength threshold) and the RSSI such that the attachment ID and the RSSI are associated with each other for a period of time T4, thus collecting attachment(s) ID and RSSI(s) in the memory 21*a*. In such a case, the controller 21 selects, from the attachment ID(s) stored in the memory 21*a*, the attachment ID that corresponds to the RSSI which has been determined as being equal to or higher than the strength threshold Th' the predetermined number of times, when, for example, the attachment 30 is attached to the quick hitch 16.

Figure 20:
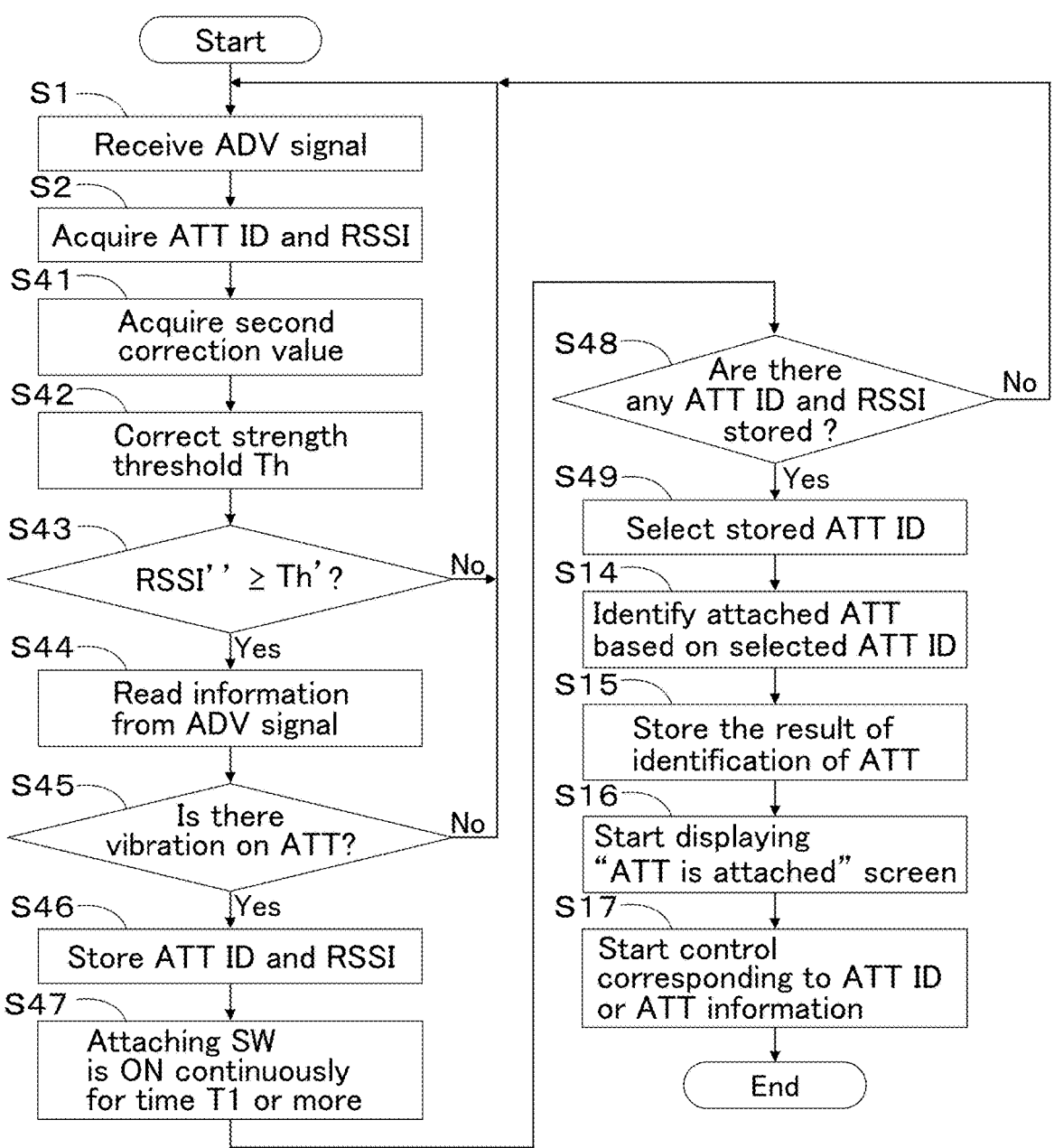
FIG. 20 is a flowchart showing an example of a securing-of-attachment recognizing process according to the third example embodiment of the present invention.

FIG. 20 is a flowchart showing an example of a securing-of-attachment recognizing process according to the third example embodiment.

Upon receipt of the advertisement signal Q1 from a beacon transmitter 33 by the beacon scanner 23 (S1), the controller 21 acquires the attachment ID and the RSSI of the advertisement signal Q1 from the beacon scanner 23 (S2).

The controller 21 refers to the second correction table stored in the storing unit 22, and acquires the second correction value that corresponds to the acquired attachment ID (S41). The controller 21 corrects the strength threshold Th using the acquired second correction value (S42).

Next, if the acquired RSSI is equal to or higher than the strength threshold Th' (corrected strength threshold) (YES in S43), the controller 21 reads information from the received advertisement signal Q1 (S44).

Next, if the information read from the advertisement signal Q1 includes vibration information indicating that the attachment 30 is vibrating, the controller 21 determines that there is vibration on the attachment 30 (YES in S45). Alternatively, if the information from the advertisement signal Q1 includes a vibration indicator and the vibration indicator is greater than a predetermined value (second predetermined value) Y, the controller 21 determines that there is vibration on the attachment 30 (YES in S45).

Next, the controller 21 causes the memory 21a to store the attachment ID included in the received advertisement signal Q1 and the RSSI of the advertisement signal Q1 such that the attachment ID and the RSSI are associated with each other (S46). On the contrary, if the RSSI is less than the corrected strength threshold Th (NO in S43), the controller 21 does not cause the memory 21a to store the attachment ID included in the received advertisement signal Q1 or the RSSI of the advertisement signal Q1, and the process returns to step S1. Also when the received advertisement signal Q1 does not include the vibration information (or the vibration indicator greater than the predetermined value Y) indicating that the attachment 30 is vibrating and the controller 21 determines that there is no vibration on the attachment 30 (NO in S45), the controller 21 does not cause the memory 21a to store the attachment ID included in the received advertisement signal Q1 or the RSSI of the advertisement signal Q1, and the process returns to step S1.

If the attaching switch 26 is operated (turned ON) for a first predetermined period of time T1 or more (S47), the controller 21 determines that the attachment 30 is attached to (secured to) the quick hitch 16. Next, the controller 21 checks whether or not the attachment ID is stored in the memory 21a.

If the memory 21a stores the attachment ID and the RSSI corresponding to the attachment ID (YES in S48), the controller 21 reads the RSSI and the attachment ID from the memory 21a and selects the attachment ID (S49). Next, the controller 21 identifies (recognizes) the attachment 30 attached to the quick hitch 16 based on the selected attachment ID (S14).

Next, the controller 21 causes the storing unit 22 to store the result of identification of the attachment 30 (S15). It is noted here that the controller 21 causes the storing unit 22 to store information indicating that the identified attachment 30 is attached to the quick hitch 16, i.e., to the working vehicle 1, and the attachment ID of the attached attachment 30. With this, the controller 21 starts a predetermined process (S16, S17).

In the above-described third example embodiment, the controller 21 uses the strength threshold Th' (corrected strength threshold) in the securing-of-attachment recognizing process, for example. The controller 21 may perform a process using the strength threshold Th' (corrected strength threshold) after starting a predetermined process. For example, the controller 21 may, in order to check the accuracy of the selection of the attachment ID based on the strength threshold Th' (corrected strength threshold) in steps S43 to S49, perform a confirming process (selection-of-attachment confirming process) based on the strength threshold Th' (corrected strength threshold).

Figure 21:
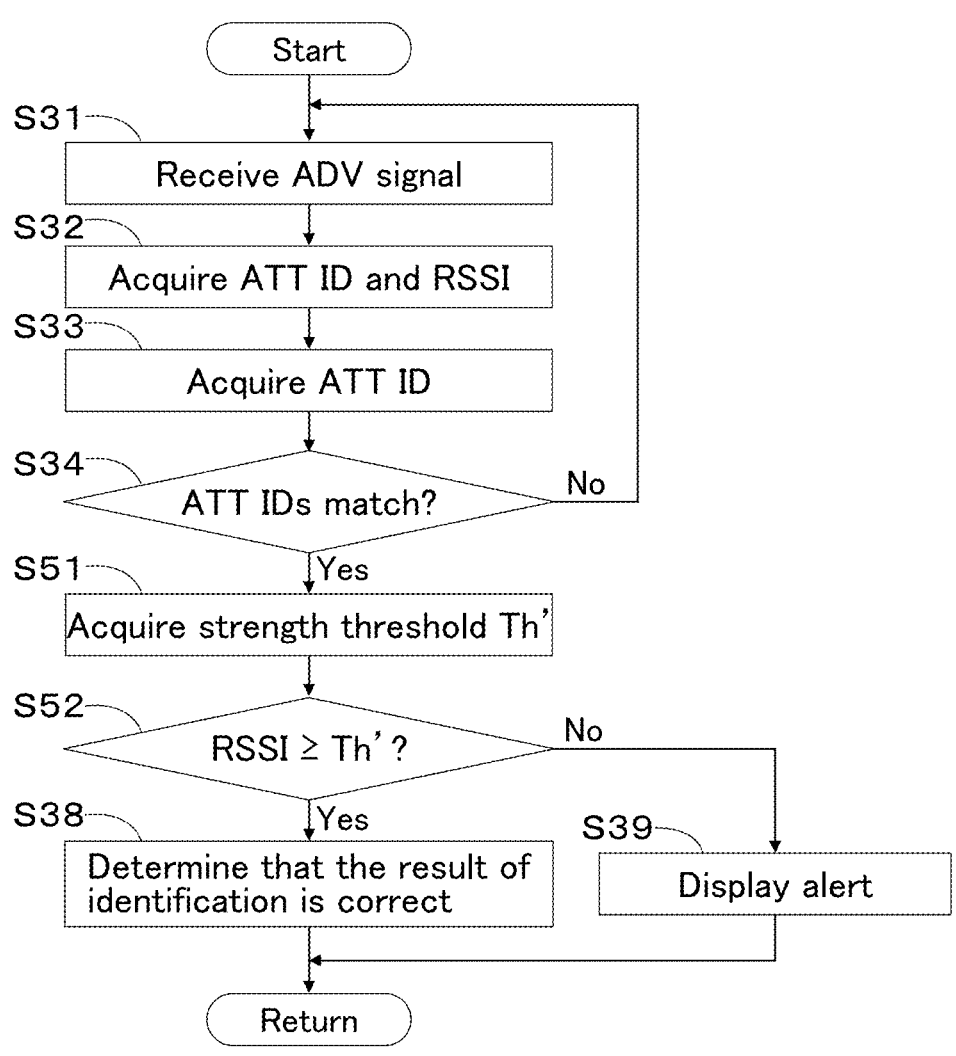
FIG. 21 is a flowchart showing an example of a selection-of-attachment confirming process according to the third example embodiment of the present invention.

FIG. 21 is a flowchart showing an example of the selection-of-attachment confirming process according to the third example embodiment. The controller 21 starts a predetermined process (S16, S17), and, if the attachment ID of the attached attachment 30 and the attachment ID acquired from the beacon scanner 23 match each other in step S34 (YES in S34), the controller 21 acquires the strength threshold Th' (corrected strength threshold) (S51). Specifically, the controller 21 may cause the storing unit 22 to store the strength threshold Th' (corrected strength threshold) in step S42 of the securing-of-attachment recognizing process, and acquire the strength threshold Th' (corrected strength threshold). The controller 21 may refer to the second correction table stored in the storing unit 22, acquire the second correction value corresponding to the acquired attachment ID, and correct the strength threshold Th using the acquired second correction value to obtain the corrected strength threshold Th.

If the acquired RSSI is equal to or higher than the strength threshold Th' (corrected strength threshold) (YES in S52), the controller 21 determines that the result of identification of the attachment 30 is correct (S38). On the contrary, if the acquired RSSI is less than the strength threshold Th' (corrected strength threshold) (NO in S52), the controller 21 causes the display of the user interface 25 or the portable device 70 etc. to display an alert (S39).

Furthermore, in a case that an attachment 30 is attached to the quick hitch 16 (in a case that the predetermined process (S16, S17) has been started), the controller 21 may correct the strength threshold Th based on the attachment ID and then further correct the corrected strength threshold based on the relative position changed by the position changer C. For example, in the selection-of-attachment confirming process, the controller 21 further corrects the strength threshold Th' (corrected strength threshold). Note that the calculation of the relative position changed by the position changer C is not detailed here because the description in the first example embodiment can be used.

The controller 21 corrects the strength threshold Th' based on the calculated relative position. For example, the controller 21 corrects the strength threshold Th' such that the strength threshold Th' increases as the relative positions of the quick hitch 16 and the machine body 2 approach each other. On the contrary, the controller 21 corrects the strength threshold Th' such that the strength threshold Th' decreases as the relative positions of the quick hitch 16 and the machine body 2 go away from each other.

In the present example embodiment, as the quick hitch 16 moves upward relative to the machine body 2, the relative positions of the quick hitch 16 and the machine body 2 approach each other, whereas, as the quick hitch 16 moves downward relative to the machine body 2, the relative positions of the quick hitch 16 and the machine body 2 go away from each other. Therefore, the controller 21 corrects the strength threshold Th' such that the strength threshold Th' increases as the quick hitch 16 moves upward relative to the machine body 2. On the contrary, the controller 21 corrects the strength threshold Th' such that the strength threshold Th' decreases as the quick hitch 16 moves downward relative to the machine body 2.

The controller 21 corrects the strength threshold Th' based on a correction function in which the relative position of the quick hitch 16 (the position of the quick hitch 16 relative to the machine body 2 in the up-and-down direction) is a variable. The correction function is stored in a predetermined storage area of the storing unit 22. Therefore, in a case that the attachment 30 is attached to the quick hitch 16 (in a case that the predetermined process (S16, S17) has been started), the controller 21 acquires the correction function from the storing unit 22 and further corrects the strength threshold Th'.

Note that, in the above-described example, the controller 21 corrects the strength threshold Th' based on the relative position and the correction function, for example. Note, however, that the method of correcting the strength threshold Th' based on the relative position is not limited to using the correction function. The strength threshold Th' may be corrected using a predetermined correction coefficient.

Figure 22:
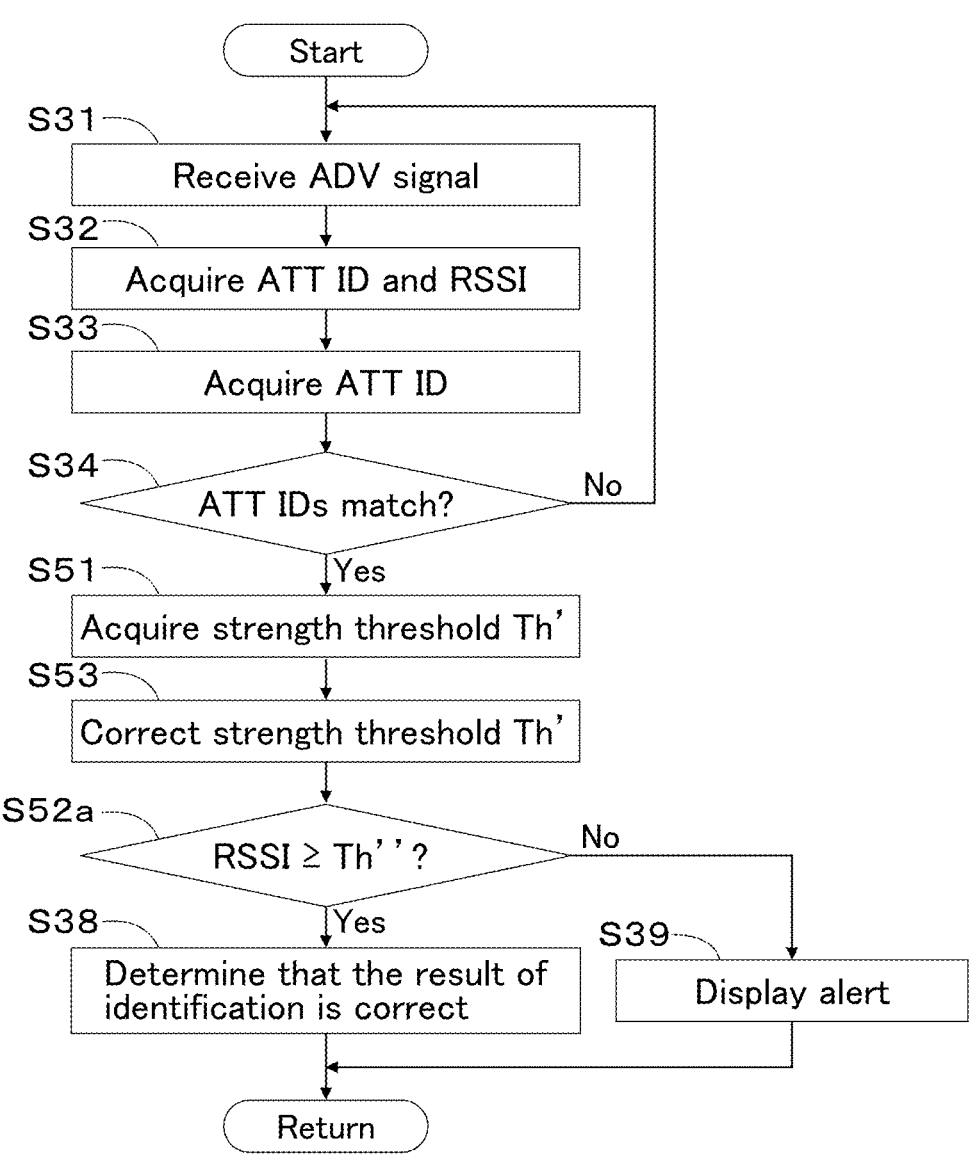
FIG. 22 is a flowchart showing another example of the selection-of-attachment confirming process according to the third example embodiment of the present invention.

FIG. 22 is a flowchart showing another example of the selection-of-attachment confirming process. In FIG. 22, upon acquisition of the strength threshold Th' (corrected strength threshold) (S51), the controller 21 further corrects the strength threshold Th' based on the correction function stored in the storing unit 22 to obtain a strength threshold Th" (S53). If the acquired RSSI is equal to or higher than the strength threshold Th" (YES in S52*a*), the controller 21 determines that the result of identification of the attachment 30 is correct (S38). On the contrary, if the RSSI is less than the strength threshold Th" (NO in S52*a*), the controller 21 causes the display of the user interface 25 or the portable device 70 etc. to display an alert (S39).

A working vehicle 1 according to the third example embodiment described above includes a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select, as a piece of identification information of the attachment 30 attached to the linkage 16, one of the one or more pieces of identification information that is included in a wireless signal Q1, having a received signal strength equal to or higher than a threshold Th, of the one or more wireless signals Q1 received by the receiver 23, and perform a predetermined process based on the selected piece of identification information, wherein the controller 21 is configured or programmed to correct the threshold Th based on each of the one or more pieces of identification information to obtain one or more corrected thresholds Th, and select, as the piece of identification information of the attachment 30 attached to the linkage 16, a piece of identification information included in one of the one or more wireless signals Q1 that has a received signal strength equal to or higher than a corresponding one of the one or more corrected thresholds Th.

An attachment usage system 100 according to the third example embodiment described above includes a linkage 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, and a receiver 23 in or on the working vehicle 1 to receive the one or more wireless signals Q1 transmitted from the one or more transmitters 33, and a controller 21 configured or programmed to select, as a piece of identification information of the attachment 30 attached to the linkage 16, one of the one or more pieces of identification information that is included in a wireless signal Q1, having a received signal strength equal to or higher than a threshold Th, of the one or more wireless signals Q1 received by the receiver 23, and perform a predetermined process based on the selected piece of identification information, wherein the controller 21 is configured or programmed to correct the threshold Th based on each of the one or more pieces of identification information to obtain one or more corrected thresholds Th, and select, as the piece of identification information of the attachment 30 attached to the linkage 16, a piece of identification information included in one of the one or more wireless signals Q1 that has a received signal strength equal to or higher than a corresponding one of the one or more corrected thresholds Th.

With the working vehicle 1 and the attachment usage system 100, it is possible to appropriately correct the received signal strength for each identification information of the attachment 30. This achieves the following. If the transmitter 33 is attached in a manner that differs from one attachment 30 to another or if the output strength of the wireless signal Q1 differs from one transmitter 33 to another, the received signal strength may vary even if such attachments 30 are at the same distance from the receiver 23. By correcting the threshold Th based on the identification information, it is possible to achieve an appropriate comparison between the received signal strength and the threshold Th.

The controller 21 may be configured or programmed to correct the threshold Th using each of one or more correction values corresponding to the one or more pieces of identification information.

With this, since the correction value(s) are allocated to the respective piece(s) of identification information, it is possible to easily and reliably correct the threshold Th.

The one or more correction values may be defined according to the one or more attachments 30 corresponding to the one or more pieces of identification information.

This achieves the following. Depending on the structure of the attachment 30, the shape of the attachment 30, and content of work done by the attachment 30, the position to which the transmitter 33 is attached may be limited and the received signal strength of the wireless signal Q1 may differ between attachments 30 located at the same distance from the receiver 23. In this regard, since the correction values are defined for the respective attachments 30, it is possible to appropriately correct the threshold in consideration of variations in received signal strengths of the attachments 30. Even in cases where transmitters 33 of different types are attached to respective attachments 30 and the output strengths of the wireless signals Q1 outputted by the transmitters 33 are different, since the correction values are defined for the respective attachments 30, it is possible to appropriately correct the threshold Th in consideration of variations in received signal strengths of the attachments 30 that would result from the types of the transmitters 33.

The one or more correction values may be defined according to one or more types of the one or more attachments 30 corresponding to the one or more pieces of identification information.

This achieves the following. Depending on the type of attachment 30, the position to which the transmitter 33 is attached may be limited depending on the content of work, and the received signal strength of the wireless signal Q1 may differ between attachments 30 located at the same distance from the receiver 23. In this regard, since the correction values are defined for the respective types of attachments 30, the controller 21 is capable of appropriately correcting the threshold Th according to the corresponding type. This makes it possible to achieve an appropriate comparison between the received signal strength and the threshold Th irrespective of variations in received signal strengths of the respective types of attachments 30.

The working vehicle 1 may further include a storing unit (a memory and/or a storage) 22 to store a table in which the one or more correction values and the one or more pieces of identification information are associated with each other. The controller 21 may be configured or programmed to acquire the one or more correction values based on the one or more pieces of identification information included in the one or more wireless signals Q1 received by the receiver 23 and on the table stored in the memory and/or the storage 22.

With this, the controller 21 is capable of easily acquiring a correction value corresponding to the identification information from the table. This makes it possible to reduce the load of the process of correcting the threshold Th on the controller 21, and possible to quickly and appropriately select the identification information of the attachment 30.

The working vehicle 1 may further include a machine body 2 including the receiver 23 therein or thereon, and a position changer C including the linkage 16 to change a relative position of the linkage 16 to the machine body 2. The controller 21 may be configured or programmed to further correct a corresponding one of the one or more corrected thresholds Th based on the relative position at a point in time at which the wireless signal Q1 is received by the receiver 23.

This achieves the following. There may be cases in which the received signal strength of a wireless signal Q1 differs between when the attachment 30 is linked to the linkage 16 and when the relative position of the linkage 16 (attachment 30) to the machine body 2 is changed by the position changer C after the attachment 30 is linked to the linkage 16, because of the change in the relative position. In this regard, since the controller 21 further corrects the corrected threshold Th based on the relative position, it is possible to achieve a more appropriate comparison between the received signal strength and the threshold Th even if the relative position is changed by the position changer C after the attachment 30 is linked to the linkage 16.

Fourth Example Embodiment

In the third example embodiment described above, the strength threshold Th is corrected based on an advertisement signal Q1, for example. The second correction value for correction of the strength threshold Th may be transmitted from a beacon transmitter 33. In such a case, the beacon transmitter 33 transmits an advertisement signal Q1 that includes a second correction value for correction of the strength threshold Th. That is, in the fourth example embodiment, the second correction value is included in other information of the advertisement signal Q1. The controller 21 corrects the strength threshold Th using the second correction value(s) included in the advertisement signal(s) Q1, and selects, as the ID of the attachment 30 attached to the quick hitch 16, the attachment ID included in the advertisement signal Q1 having a received signal strength equal to or higher than the corrected threshold Th. Note that how specifically second correction values are defined etc. are the same as those described earlier in the third example embodiment, and details thereof are not repeated here.

Figure 23:
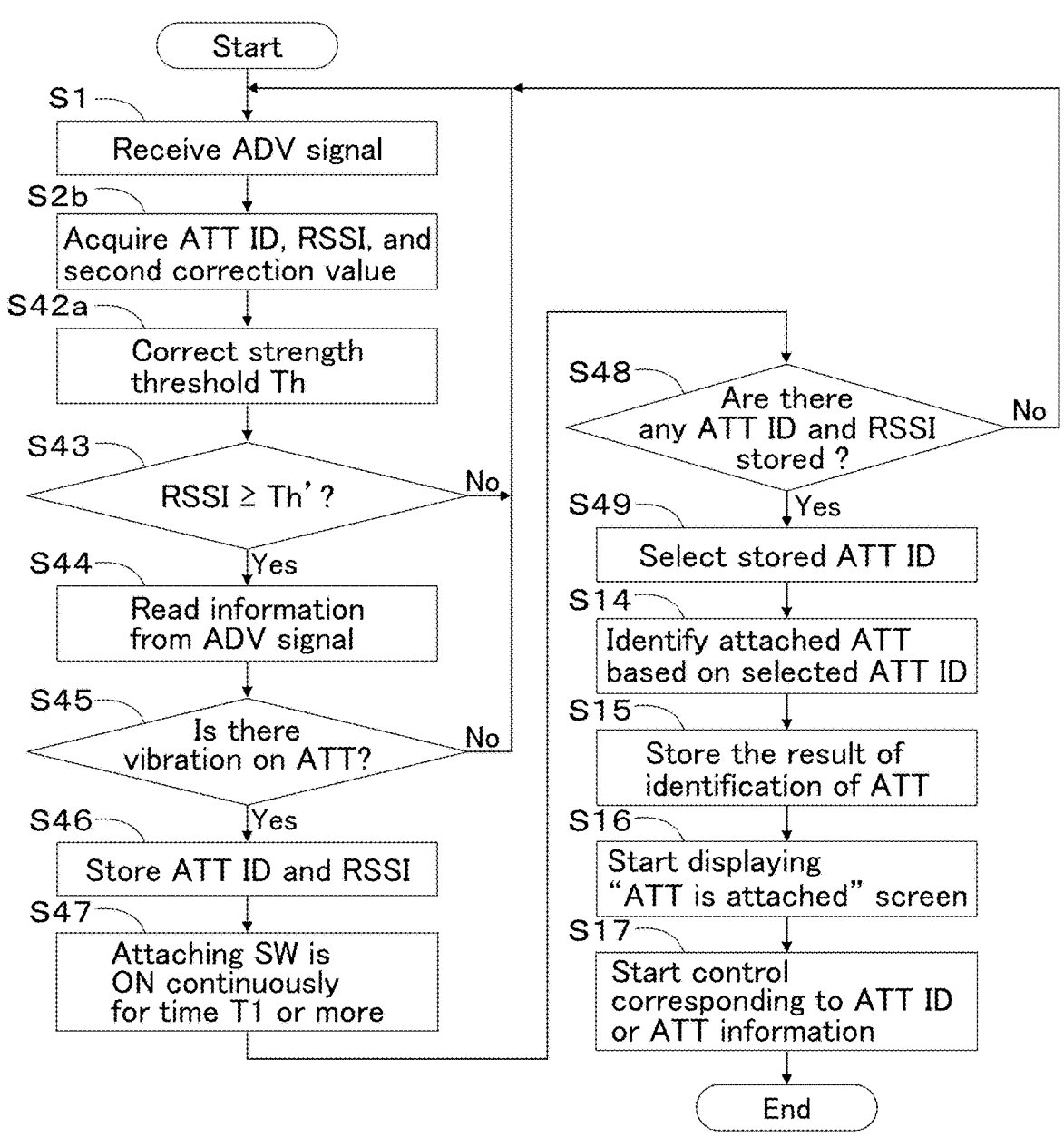
FIG. 23 is a flowchart showing an example of a securing-of-attachment recognizing process according to a fourth example embodiment of the present invention.

FIG. 23 is a flowchart showing an example of a securing-of-attachment recognizing process according to the fourth example embodiment. In the fourth example embodiment, upon receipt of an advertisement signal Q1 from a beacon transmitter 33 by the beacon scanner 23 (S1), the controller 21 acquires the attachment ID, RSSI, and second correction value of the advertisement signal Q1 from the beacon scanner 23 (S2*b*). Upon acquisition of the attachment ID, RSSI, and the second correction value, the controller 21 corrects the strength threshold Th using the acquired second correction value (S42*a*). After performing step S42*a*, the controller 21 performs step S43 and subsequent steps.

A working vehicle 1 as has been described includes a linkage 16 to attach and detach an attachment 30 thereto and therefrom, a receiver 23 to receive one or more wireless signals Q1 which are transmitted periodically from one or more transmitters 33 in or on one or more of the attachments 30, which include respective one or more pieces of identification information of the one or more attachments 30, and which are compliant with a near field communication standard, and a controller 21 configured or programmed to select, as a piece of identification information of the attachment 30 attached to the linkage 16, one of the one or more pieces of identification information that is included in a wireless signal Q1, having a received signal strength equal to or higher than a threshold Th, of the one or more wireless signals Q1 received by the receiver 23, and perform a predetermined process based on the selected piece of identification information, wherein the one or more transmitters 33 are operable to transmit the one or more wireless signals Q1 including one or more correction values to correct the threshold Th, and the controller 21 is configured or programmed to correct the threshold Th using each of the one or more correction values included in the one or more wireless signals Q1 to obtain one or more corrected thresholds Th, and select, as the piece of identification information of the attachment 30 attached to the linkage 16, a piece of identification information included in one of the one or more wireless signals Q1 that has a received signal strength equal to or higher than a corresponding one of the one or more corrected thresholds Th.

An attachment usage system 100 as has been described includes a linkage 16 on a working vehicle 1 to attach and detach an attachment 30 thereto and therefrom, one or more transmitters 33 in or on one or more of the attachments 30 to periodically transmit one or more wireless signals Q1 which include one or more pieces of identification information of the one or more attachments 30 and which are compliant with a near field communication standard, a receiver 23 in or on the working vehicle 1 to receive the one or more wireless signals Q1 transmitted from the one or more transmitters 33, and a controller 21 configured or programmed to select, as a piece of identification information of the attachment 30 attached to the linkage 16, one of the one or more pieces of identification information that is included in a wireless signal Q1, having a received signal strength equal to or higher than a threshold Th, of the one or more wireless signals Q1 received by the receiver 23, and perform a predetermined process based on the selected piece of identification information, wherein the one or more transmitters 33 are operable to transmit the one or more wireless signals Q1 including one or more correction values to correct the threshold Th, and the controller 21 is configured or programmed to correct the threshold Th using each of the one or more correction values included in the one or more wireless signals Q1 to obtain one or more corrected thresholds Th, and select, as the piece of identification information of the attachment 30 attached to the linkage 16, a piece of identification information included in one of the one or more wireless signals Q1 that has a received signal strength equal to or higher than a corresponding one of the one or more corrected thresholds Th.

With the working vehicle 1 and the attachment usage system 100, it is possible to appropriately correct the received signal strength for each identification information of the attachment 30. This achieves the following. If the transmitter 33 is attached in a manner that differs from one attachment 30 to another or if the output strength of the wireless signal Q1 differs from one transmitter 33 to another, the received signal strength may vary even if such attachments 30 are at the same distance from the receiver 23. By correcting the threshold Th based on the correction value included in the wireless signal Q1, it is possible to achieve an appropriate comparison between the received signal strength and the threshold Th. Furthermore, since the wireless signal Q1 includes the correction value, it is possible to reduce the load of the process of correcting received signal strength on the controller 21, and possible to quickly and appropriately select the identification information of the attachment 30.

While example embodiments of the present invention have been described above, it is to be understood that variations and modifications will be apparent to those skilled in the art without departing from the scope and spirit of the present invention. The scope of the present invention, therefore, is to be determined solely by the following claims.

For example, in the above-described example embodiments, each attachment 30 may be provided with a beacon transmitter 33 to transmit a wireless signal (advertisement signal Q1) compliant with Bluetooth (registered trademark) Low Energy, and the working vehicle 1 may be provided with a beacon scanner 23 to receive the wireless signals. However, additionally or alternatively, for example, the attachment 30 may be provided with a transmitter such as a radio frequency identification (RFID) tag, and the working vehicle 1 may be provided with a receiver to receive wireless signals transmitted from the RFID. Additionally or alternatively, the attachment 30 may be provided with a transmitter to transmit radio waves for some other near field communication, and the working vehicle 1 may be provided with a receiver to receive the radio waves.

In the above-described example embodiments, the working vehicle 1 may be provided with the quick hitch 16. Alternatively, the working vehicle 1 may be provided with a hitch having a different structure from the quick hitch 16, a quick hitch to which an attachment 30 can be attached and detached both automatically and manually, or a hitch to which an attachment 30 can be attached and detached only manually. In the case where the operator manually attaches the attachment 30 to the hitch or manually detaches the attachment 30 from the hitch, the operator may input information indicating that the attachment 30 is attached or detached using the user interface 25.

In the above-described example embodiments, the operator may input attachment information relating to the attachment 30 attached to the quick hitch 16 using the user interface 25 provided in or on the working vehicle 1. However, for example, the operator or the like may input attachment information relating to the attachment 30 attached to the quick hitch 16 using a portable device 70. That is, the portable device 70 may be used as a user interface instead of the user interface 25.

In such a case, upon input of attachment information into the portable device 70, the portable device 70 transmits the attachment information to the communicator 24 of the working vehicle 1 via the Internet and/or the like. Upon receipt of the attachment information by the communicator 24, the controller 21 of the working vehicle 1 recognizes the attachment 30 attached to the quick hitch 16 based on the attachment ID included in the attachment information.

In the above-described example embodiments, the working device 4, the quick hitch 16, and the specific attachment 30*b* are provided with hydraulic actuators (such as the boom cylinders 14, the front cylinders 15, and the latch cylinder 52). Additionally or alternatively, the working device 4, the quick hitch 16, and the specific attachment may be provided with electric actuators. In the case where an attachment including an electric actuator is attached to the quick hitch 16, the controller 21 may output, as power for the electric actuator, electricity (power) from the battery 20 (FIG. 1) to the attachment via an external electric wire based on control data corresponding to the attachment.

An attachment including a work member to be actuated by power from the prime mover 9 of the working vehicle 1 may be attached to the quick hitch 16. In the case where such an attachment including a work member is attached to the quick hitch 16, the controller 21 may output power from the prime mover 9 to the attachment via a power transmission mechanism including gear(s), shaft(s), and/or the like based on control data corresponding to the attachment.

In the foregoing example embodiments, the controller 21 may be configured or programmed to calculate a value for judgment (judgment value) based on RSSI and compares the judgment values of respective attachment IDs to automatically select an attachment ID, for example. Note, however, that the controller 21 may be configured or programmed to selectively enter a mode in which the controller 21 selects an attachment ID automatically (automatic selection mode) or a mode in which an operator or the like manually selects an attachment ID (manual selection mode). In such a case, for example, an administrator performs a predetermined operation on the user interface 25 to enter the automatic selection mode or the manual selection mode. In the manual selection mode, when an attachment 30 is attached to the hitch 16, the controller 21 causes the user interface 25 or the portable device 70 etc. to display an attachment list including a plurality of pieces of attachment information relating to respective attachments 30 attachable to the hitch 16, and starts a predetermined process based on the attachment 30 attached to the hitch 16 that corresponds to one of the pieces of attachment information selected from the attachment list via the user interface 25 or the portable device 70 etc.

What is claimed is:

1. A working vehicle comprising:

a machine body;

a linkage to attach and detach one of one or more attachments selectively thereto and therefrom;

a position changer including the linkage to change a relative position of the linkage to the machine body;

a receiver to receive one or more wireless signals which are transmitted periodically from one or more transmitters in or on the one or more attachments, which include respective one or more pieces of identification information relating to the one or more attachments, and which are compliant with a near field communication standard, the machine body including the receiver therein or thereon; and a controller configured or programmed to:

select a piece of identification information relating to one of the one or more attachments attached to the linkage based on one or more received signal strengths of the one or more wireless signals received by the receiver; and perform a predetermined process based on the selected piece of identification information; wherein the controller is configured or programmed to:

correct the one or more received signal strengths based on the one or more pieces of identification information;

in a case that any of the one or more attachments is attached to the linkage, further correct, based on the relative position, the corrected received signal strength of the wireless signal transmitted from the transmitter in or on the attached one of the one or more attachments; and select the piece of identification information relating to the attached one of the one or more attachments attached to the linkage based on the further corrected received signal strengths.

2. The working vehicle according to claim 1, wherein the controller is configured or programmed to correct the one or more received signal strengths using one or more correction values corresponding to the one or more pieces of identification information.

3. The working vehicle according to claim 2, wherein the one or more correction values are defined according to the one or more attachments corresponding to the one or more pieces of identification information.

4. The working vehicle according to claim 3, wherein the one or more correction values are defined according to one or more types of the one or more attachments corresponding to the one or more pieces of identification information.

5. The working vehicle according to claim 3, further comprising:

a memory and/or a storage to store a table in which the one or more correction values and the one or more pieces of identification information are associated with each other; wherein the controller is configured or programmed to acquire the one or more correction values based on the one or more pieces of identification information included in the one or more wireless signals received by the receiver and on the table stored in the memory and/or the storage.

6. The working vehicle according to claim 1, wherein the linkage includes a hitch to attach and detach one of the one or more attachments selectively thereto and therefrom;

the controller is configured or programmed to cause a memory to store, for a period of time, the one or more pieces of identification information included in the one or more wireless signals received by the receiver; and the controller is configured or programmed to, when any of the one or more attachments is attached to the hitch, perform the predetermined process based on one of the one or more pieces of identification information that (i) is stored in the memory and (ii) is included in one of the one or more wireless signals that is highest in corrected received signal strength.

7. A working vehicle comprising:

a machine body;

a linkage to attach and detach one of one or more attachments selectively thereto and therefrom;

a position changer including the linkage to change a relative position of the linkage to the machine body;

a receiver to receive one or more wireless signals which are transmitted periodically from one or more transmitters in or on the one or more attachments, which include respective one or more pieces of identification information relating to the one or more attachments, and which are compliant with a near field communication standard, the machine body including the receiver therein or thereon; and a controller configured or programmed to:

select a piece of identification information relating to one of the one or more attachments attached to the linkage based on one or more received signal strengths of the one or more wireless signals received by the receiver; and perform a predetermined process based on the selected piece of identification information; wherein the one or more transmitters are operable to transmit the one or more wireless signals including one or more correction values to correct the one or more received signal strengths; and the controller is configured or programmed to;

correct the one or more received signal strengths using the one or more correction values included in the one or more wireless signals;

in a case that any of the one or more attachments is attached to the linkage, further correct, based on the relative position, the corrected received signal strength of the wireless signal transmitted from the transmitter in or on the attached one of the one or more attachments; and select the piece of identification information relating to the attached one of the one or more attachments attached to the linkage based on the further corrected received signal strength.

8. The working vehicle according to claim 7, wherein the one or more correction values are defined according to the one or more attachments corresponding to the one or more pieces of identification information.

9. The working vehicle according to claim 8, wherein the one or more correction values are defined according to one or more types of the one or more attachments corresponding to the one or more pieces of identification information.

10. The working vehicle according to claim 7, wherein the linkage includes a hitch to attach and detach one of the one or more attachments selectively thereto and therefrom;

the controller is configured or programmed to cause a memory to store, for a period of time, the one or more pieces of identification information included in the one or more wireless signals received by the receiver; and the controller is configured or programmed to, when any of the one or more attachments is attached to the hitch, perform the predetermined process based on one of the one or more pieces of identification information that (i) is stored in the memory and (ii) is included in one of the one or more wireless signals that is highest in corrected received signal strength.

11. A working vehicle comprising:

a machine body;

a linkage to attach and detach one of one or more attachments selectively thereto and therefrom;

a position changer including the linkage to change a relative position of the linkage to the machine body;

a receiver to receive one or more wireless signals which are transmitted periodically from one or more transmitters in or on the one or more attachments, which include respective one or more pieces of identification information relating to the one or more attachments, and which are compliant with a near field communication standard, the machine body including the receiver therein or thereon; and a controller configured or programmed to:

select, as a piece of identification information relating to one of the one or more attachments attached to the linkage, one of the one or more pieces of identification information that is included in a wireless signal, having a received signal strength equal to or higher than a threshold, of the one or more wireless signals received by the receiver; and perform a predetermined process based on the selected piece of identification information; wherein the controller is configured or programmed to:

correct the threshold based on each of the one or more pieces of identification information to obtain one or more corrected thresholds;

further correct a corresponding one of the one or more corrected thresholds based on the relative position at a point in time at which the wireless signal is received by the receiver; and select, as the piece of identification information relating to the attached one of the one or more attachments attached to the linkage, a piece of identification information included in one of the one or more wireless signals that has a received signal strength equal to or higher than a corresponding one of the one or more further corrected thresholds.

12. The working vehicle according to claim 11, wherein the controller is configured or programmed to correct the threshold using each of one or more correction values corresponding to the one or more pieces of identification information.

13. The working vehicle according to claim 12, wherein the one or more correction values are defined according to the one or more attachments corresponding to the one or more pieces of identification information.

14. The working vehicle according to claim 13, wherein the one or more correction values are defined according to one or more types of the one or more attachments corresponding to the one or more pieces of identification information.

15. The working vehicle according to claim 13, further comprising:

a memory and/or a storage to store a table in which the one or more correction values and the one or more pieces of identification information are associated with each other; wherein the controller is configured or programmed to acquire the one or more correction values based on the one or more pieces of identification information included in the one or more wireless signals received by the receiver and on the table stored in the memory and/or the storage.

16. A working vehicle comprising:

a machine body;

a linkage to attach and detach one of one or more attachments selectively thereto and therefrom;

a position changer including the linkage to change a relative position of the linkage to the machine body;

a receiver to receive one or more wireless signals which are transmitted periodically from one or more transmitters in or on the one or more attachments, which include respective one or more pieces of identification information relating to the one or more attachments, and which are compliant with a near field communication standard, the machine body including the receiver therein or thereon; and a controller configured or programmed to:

select, as a piece of identification information relating to one of the one or more attachments attached to the linkage, one of the one or more pieces of identification information that is included in a wireless signal, having a received signal strength equal to or higher than a threshold, of the one or more wireless signals received by the receiver; and perform a predetermined process based on the selected piece of identification information; wherein the one or more transmitters are operable to transmit the one or more wireless signals including one or more correction values to correct the threshold; and the controller is configured or programmed to:

correct the threshold using each of the one or more correction values included in the one or more wireless signals to obtain one or more corrected thresholds;

further correct a corresponding one of the one or more corrected thresholds based on the relative position at a point in time at which the wireless signal is received by the receiver; and select, as the piece of identification information relating to the attached one of the one or more attachments attached to the linkage, a piece of identification information included in one of the one or more wireless signals that has a received signal strength equal to or higher than a corresponding one of the one or more further corrected thresholds.

17. The working vehicle according to claim 16, wherein the controller is configured or programmed to correct the threshold using each of the one or more correction values corresponding to the one or more pieces of identification information.

18. The working vehicle according to claim 17, wherein the one or more correction values are defined according to the one or more attachments corresponding to the one or more pieces of identification information.

19. The working vehicle according to claim 18, wherein the one or more correction values are defined according to one or more types of the one or more attachments corresponding to the one or more pieces of identification information.

20. An attachment usage system comprising:

a linkage on a working vehicle to attach and detach one of one or more attachments selectively thereto and therefrom;

a position changer including the linkage to change a relative position of the linkage to a machine body of the working vehicle;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters, the machine body including the receiver therein or thereon; and a controller configured or programmed to:

select a piece of identification information relating to one of the one or more attachments attached to the linkage based on one or more received signal strengths of the one or more wireless signals received by the receiver; and perform a predetermined process based on the selected piece of identification information; wherein the controller is configured or programmed to:

correct the one or more received signal strengths based on the one or more pieces of identification information;

in a case that any of the one or more attachments is attached to the linkage, further correct, based on the relative position, the corrected received signal strength of the wireless signal transmitted from the transmitter in or on the attached one of the one or more attachments; and select the piece of identification information relating to the attached one of the one or more attachments attached to the linkage based on the further corrected received signal strengths.

21. An attachment usage system comprising:

a linkage on a working vehicle to attach and detach one of one or more attachments selectively thereto and therefrom;

a position changer including the linkage to change a relative position of the linkage to a machine body of the working vehicle;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters, the machine body including the receiver therein or thereon; and a controller configured or programmed to:

select a piece of identification information relating to one of the one or more attachments attached to the linkage based on one or more received signal strengths of the one or more wireless signals received by the receiver; and perform a predetermined process based on the selected piece of identification information; wherein the one or more transmitters are operable to transmit the one or more wireless signals including one or more correction values to correct the one or more received signal strengths; and the controller is configured or programmed to:

correct the one or more received signal strengths using the one or more correction values included in the one or more wireless signals;

in a case that any of the one or more attachments is attached to the linkage, further correct, based on the relative position, the corrected received signal strength of the wireless signal transmitted from the transmitter in or on the attached one of the one or more attachments; and select the piece of identification information relating to the attached one of the one or more attachments attached to the linkage based on the further corrected received signal strengths.

22. An attachment usage system comprising:

a linkage on a working vehicle to attach and detach one of one or more attachments selectively thereto and therefrom; a position changer including the linkage to change a relative position of the linkage to a machine body of the working vehicle;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters, the machine body including the receiver therein or thereon; and a controller configured or programmed to:

select, as a piece of identification information relating to one of the one or more attachments attached to the linkage, one of the one or more pieces of identification information that is included in a wireless signal, having a received signal strength equal to or higher than a threshold, of the one or more wireless signals received by the receiver; and perform a predetermined process based on the selected piece of identification information; wherein the controller is configured or programmed to:

correct the threshold based on each of the one or more pieces of identification information to obtain one or more corrected thresholds;

further correct a corresponding one of the one or more corrected thresholds based on the relative position at a point in time at which the wireless signal is received by the receiver; and select, as the piece of identification information relating to the attached one of the one or more attachments attached to the linkage, a piece of identification information included in one of the one or more wireless signals that has a received signal strength equal to or higher than a corresponding one of the one or more further corrected thresholds.

23. An attachment usage system comprising:

a linkage on a working vehicle to attach and detach one of one or more attachments selectively thereto and therefrom;

a position changer including the linkage to change a relative position of the linkage to a machine body of the working vehicle;

one or more transmitters in or on the one or more attachments to periodically transmit one or more wireless signals which include one or more pieces of identification information relating to the one or more attachments and which are compliant with a near field communication standard;

a receiver in or on the working vehicle to receive the one or more wireless signals transmitted from the one or more transmitters, the machine body including the receiver therein or thereon; and a controller configured or programmed to:

select, as a piece of identification information relating to one of the one or more attachments attached to the linkage, one of the one or more pieces of identification information that is included in a wireless signal, having a received signal strength equal to or higher than a threshold, of the one or more wireless signals received by the receiver; and perform a predetermined process based on the selected piece of identification information; wherein the one or more transmitters are operable to transmit the one or more wireless signals including one or more correction values to correct the threshold; and the controller is configured or programmed to:

correct the threshold using each of the one or more correction values included in the one or more wireless signals to obtain one or more corrected thresholds;

further correct a corresponding one of the one or more corrected thresholds based on the relative position at a point in time at which the wireless signal is received by the receiver; and select, as the piece of identification information relating to the attached one of the one or more attachments attached to the linkage, a piece of identification information included in one of the one or more wireless signals that has a received signal strength equal to or higher than a corresponding one of the one or more further corrected thresholds.

* * * * *